(12) United States Patent
Amin et al.

(10) Patent No.: US 6,606,197 B2
(45) Date of Patent: Aug. 12, 2003

(54) DUAL GRATING FILTERING SYSTEM

(75) Inventors: Jaymin Amin, Corning, NY (US);
Eliseo Romolo Ranalli, Irvine, CA (US); Bradley A. Scott, Huntington Beach, CA (US); John P. Kondis, Costa Mesa, CA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/145,455

(22) Filed: May 13, 2002

(65) Prior Publication Data
US 2003/0030915 A1 Feb. 13, 2003

Related U.S. Application Data

(63) Continuation of application No. 09/538,411, filed on Mar. 28, 2000, now abandoned.

(51) Int. Cl.[7] .......................... G02B 27/10; G02B 27/14
(52) U.S. Cl. ........................................ 359/618; 359/634
(58) Field of Search ............................... 359/618, 629, 359/634, 640

(56) References Cited

U.S. PATENT DOCUMENTS

| | | | | |
|---|---|---|---|---|
| 5,111,321 A | * | 5/1992 | Patel | .......................... 349/198 |
| 5,251,058 A | * | 10/1993 | MacArthur | ................. 359/249 |
| 5,414,540 A | * | 5/1995 | Patel et al. | .................. 349/196 |
| 5,659,637 A | | 8/1997 | Bagley, Jr. et al. | ......... 382/278 |
| 5,999,255 A | | 12/1999 | Dupee et al. | ................ 356/301 |
| 6,023,370 A | | 2/2000 | Lin | ............................. 359/487 |
| 6,097,518 A | * | 8/2000 | Wu et al. | .................... 359/128 |

* cited by examiner

Primary Examiner—Ricky Mack
(74) Attorney, Agent, or Firm—Mary Y. Redman

(57) ABSTRACT

A light filtering assembly for filtering an input beam of light having a plurality of desired wavelength components and a plurality of unwanted wavelength components so as to provide an output beam having only the desired wavelength components. The filtering assembly comprises an input section, a filtering section, and an output section. The input section divides the input beam into a plurality of polarized beamlets that travel along a corresponding plurality of spatially separated beam paths. The polarized beamlets comprise a plurality of desired beamlets corresponding to the desired wavelength components of the input beam and a plurality of unwanted beamlets corresponding to the unwanted wavelength components of the input beam. The filtering section is disposed in the paths of the beamlets so that the desired beamlets are passed and the unwanted beamlets are blocked. The output section is disposed in the paths of the desired beamlets exiting the filtering section and combines the desired beamlets so as to form the output beam. The output section is substantially identical to the input section to provide bi-directional capabilities. Because the beamlets are linearly polarized, the input and output sections are able to realize a high throughput efficiency.

25 Claims, 12 Drawing Sheets

DUAL GRATING FILTERING SYSTEM

This is a continuing application claiming the priority of U.S. application Ser. No. 09/538,411 filed on Mar. 28, 2000 now abandoned—entitled "Dual Grating Filtering System", which is hereby incorporated by reference in its entirety.

BACKGROUND OF THE INVENTION

1. Field of the Invention

The present invention relates to light wave manipulating devices and, in particular, relates to filtering devices that are capable of selectively attenuating an input light beam according to wavelength such that a relatively steep attenuation curve is realized.

2. Description of the Related Art

Telecommunication networks increasingly rely on the manipulation, transmission, and detection of electromagnetic waves, or light, to provide information carrying channels with increased capacity. A typical optical channel may utilize a light source to provide a modulated light beam, a light detection device to demodulate the light beam, and a fiber optic cable to provide a beam path.

To increase the information carrying capacity of telecommunication networks, light having a plurality of wavelength components is transmitted along the cable such that each wavelength component acts as a separate channel. Since it is desirable to maximize the number of channels, the components usually have a small wavelength separation.

To further increase the information carrying capacity, light waves may be simultaneously transmitted along a single cable in opposite directions. One of the light waves includes a first plurality of desired wavelength components and the other of the light waves includes a second plurality of desired wavelengths. The wavelengths of the first wavelength components are usually interleaved between the second wavelength components.

Since the light waves are attenuated as they travel along the fiber optic cable, light amplifying stages are usually positioned along the beam path. Each stage typically includes an active medium that is optically pumped by electrically driven pump sources.

As the light waves travel along the cable, they often degrade due to cross talk among the channels and accumulate noise which introduces unwanted wavelength components into the channels. If allowed to enter the amplifying devices, the unwanted wavelength components are amplified along with the desired wavelength components. The unwanted wavelength components may limit the ability of light detection devices to detect individual desired wavelength components.

To reduce the problems of the unwanted wavelength components, a light filtering device is usually positioned in front of each light amplifying device. Ideally, the light filtering device completely blocks the unwanted wavelength components without attenuating the desired wavelength components. However, since light filtering devices known in the art have a limited ability to block the unwanted components without attenuating a substantial amount of the desired components and since the wavelengths of the wanted and desired wavelength components are often relatively close to each other, such light filtering may not provide an acceptable signal to noise ratio.

From the foregoing, therefore, it will be appreciated that there is a need for an improved light filtering device for filtering a light wave. In particular, the device should have improved filtering characteristics that allow it to simultaneously block unwanted wavelength components and pass desired wavelength components such that an improved signal to noise ratio is realized.

SUMMARY OF THE INVENTION

The aforementioned needs are satisfied by the present invention which, according to one aspect, is a light filtering assembly for filtering an input beam of light having a plurality of desired wavelength components and a plurality of unwanted wavelength components. The assembly comprises an input section disposed in the path of the input beam. The input section divides the input beam into a plurality of polarized beamlets that travel along a corresponding plurality of spatially separated beam paths. The plurality of polarized beamlets comprises (a) a plurality of desired beamlets corresponding to the desired wavelength components and (b) a plurality of unwanted beamlets corresponding to the unwanted wavelength components. The assembly further comprises a filter section disposed in the beam paths so as to receive the desired beamlets from the filter section. The filter section attenuates the unwanted beamlets and passes the desired beamlets. The assembly further comprises an output section disposed so as to receive the desired beamlets from the filter section. The output section spatially combines the desired beamlets so as to provide a filtered output beam comprising the desired wavelength components of the input beam.

Another aspect of the present invention is a method of filtering an input beam of light having a plurality of desired wavelength components and a plurality of unwanted wavelength components so as to provide a filtered output beam of light comprising the desired wavelength components. The method comprises dividing the input beam into a plurality of polarized beamlets that travel along spatially separated beam paths. The plurality of polarized beamlets comprise (a) a plurality of desired beamlets corresponding to the desired wavelength components and (b) a plurality of unwanted beamlets corresponding to the unwanted wavelength components. The desired beamlets are separated from the unwanted beamlets and then combined so as to provide the filtered output beam.

Yet another aspect of the present invention is a light manipulating assembly for manipulating an input beam of light having a plurality wavelength components so as to provide an output beam of light. The assembly comprises an input section disposed in the path of the input beam. The input section divides the input beam into a first plurality of polarized monochromatic beamlets that travel along a corresponding plurality of spatially separated beamlet paths. The assembly further comprises a beamlet manipulator disposed in the beamlet paths so as to manipulate at least one of the first plurality of polarized beamlets in a spatially dependent manner. The beamlet manipulator provides a second plurality of polarized beamlets. The assembly further comprises an output section disposed so as to receive the second plurality of polarized beamlets exiting the beamlet manipulator. The output section constructs the output beam from the second plurality of polarized beamlets.

In one embodiment, the first plurality of polarized beamlets comprises (a) a plurality of desired beamlets corresponding to a plurality of desired wavelength components of the input beam and (b) a plurality of unwanted beamlets corresponding to a plurality of unwanted wavelength components of the input beam. The second plurality of polarized beamlets comprises the plurality of desired beamlets. The beamlet manipulator comprises a filter section which attenuates the unwanted beamlets and passes the desired beamlets. The filter section comprises an opaque material having a plurality of apertures and is disposed so that the plurality of desired beamlets are aligned with the plurality of apertures and the plurality of unwanted beamlets are not aligned with the plurality of apertures. The output section spatially combines the desired beamlets exiting the filter section so as to construct the output beam which comprises the desired wavelength components of the input beam.

Another aspect of the present invention is a light filtering system for filtering a first and second input beam of light having respective first and second pluralities of desired wavelength components and respective first and second pluralities of unwanted wavelength components. The system comprises an input section disposed in the paths of the first and second input beams. The input section divides the first and second input beams into respective first and second pluralities of polarized beamlets that travel along respective first and second pluralities of spatially separated beam paths. The first and second pluralities of polarized beamlets comprise (a) respective first and second pluralities of desired beamlets corresponding to the desired wavelength components of the first and second input beams and (b) respective first and second pluralities of unwanted beamlets corresponding to the unwanted wavelength components of the first and second input beams. The system further comprises a filter section disposed in the first and second beam paths. The filter section attenuates the first and second pluralities of unwanted beamlets and passes the first and second pluralities of desired beamlets. The system further comprises an output section disposed so as to receive the first and second pluralities of desired beamlets from the filter section. The output section spatially combines the first plurality of desired beamlets so as to provide a first filtered output beam that comprises the desired wavelength components of the first input beam. The output section spatially combines the second plurality of desired beamlets so as to provide a second filtered output beam that comprises the desired wavelength components of the second input beam.

From the foregoing, it should be apparent that light dispersing assembly of the present invention is able filter the input beam such that the filtered output beam is substantially devoid of the unwanted wavelength components of the input beam. Furthermore, the light dispersing assembly is able to pass the desired wavelength components with high throughput efficiency. These and other objects and advantages of the present invention will become more apparent from the following description taken in conjunction with the accompanying drawings.

DETAILED DESCRIPTION OF THE PREFERRED EMBODIMENT

Figure 1:
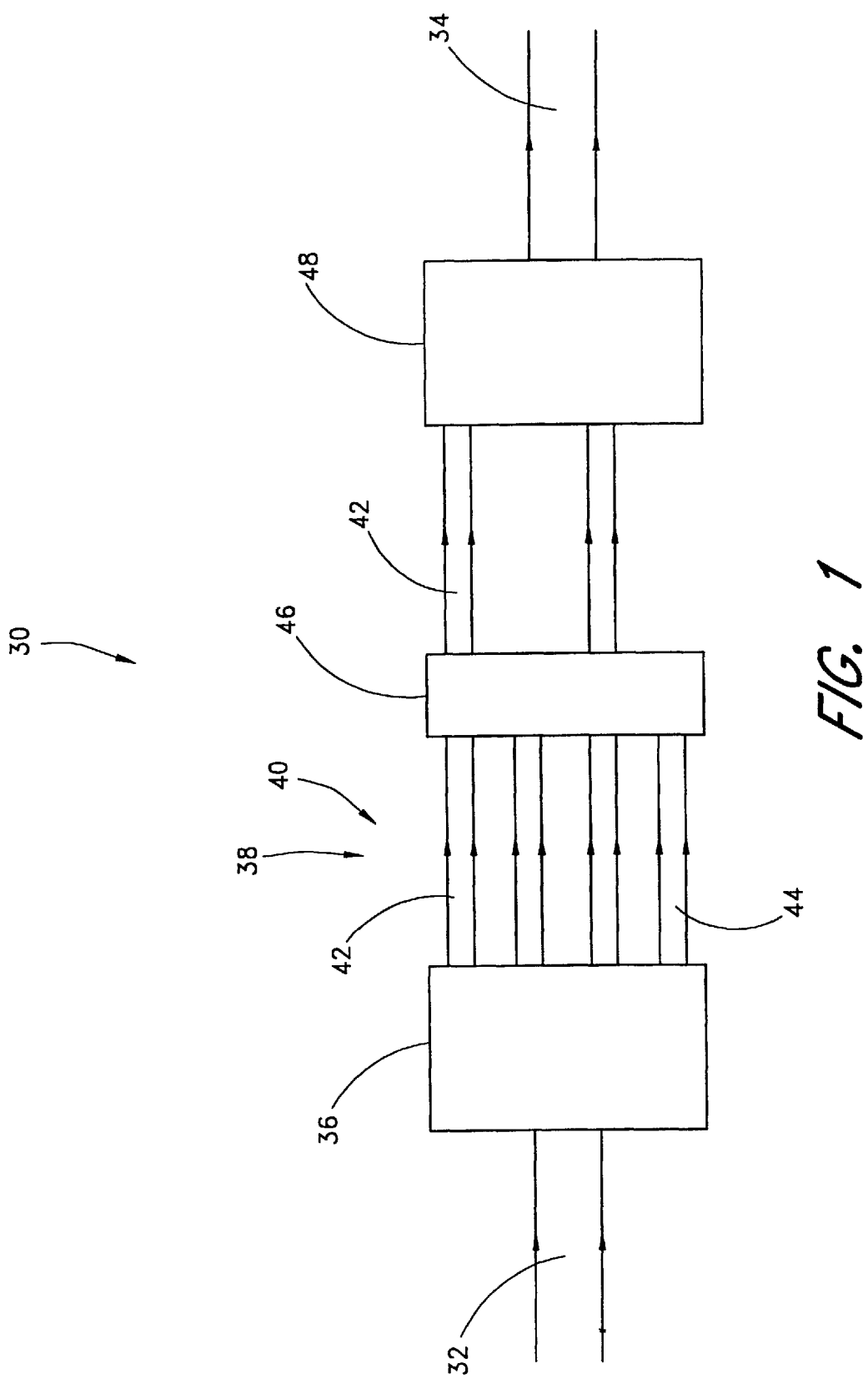
FIG. 1 is a schematic diagram of one embodiment of a light filtering assembly for filtering an input beam of light.

Reference will now be made to the drawings wherein like numerals refer to like parts throughout. FIG. 1 schematically illustrates a light filtering assembly 30 in accordance with one aspect of the present invention. The assembly 30 receives an input beam 32 of electromagnetic radiation comprising a plurality of wavelength components and, thus, a relatively large overall spectral bandwidth. The plurality of wavelength components generally includes a plurality of desired wavelength components along with a plurality of unwanted wavelength components. In one embodiment, each wavelength component of the input beam 32 has a relatively narrow spectral bandwidth centered about a different wavelength, wherein the bandwidth of each wavelength components is substantially less than the bandwidth of the input beam 32. In one embodiment, the wavelength components of the input beam 32 are substantially monochromatic. Each wavelength component also includes first and second linearly polarized sub-components having orthogonal axes of polarization. As will be described in greater detail below, the assembly 30 separates the unwanted wavelength components from the desired wavelength components and then recombines the desired wavelength components with high efficiency so as to pass a substantial portion of the desired wavelength components of the input beam into an output beam 34 and so as to divert a substantial portion of the unwanted wavelength components of the input beam away from the output beam 34.

As schematically shown in FIG. 1, the assembly 30 comprises an input section 36 that separates the input beam 32 into a corresponding plurality of monochromatic polarized beamlets 38 which travel along a plurality of spatially separated beam paths 40. The beamlets 38 are spatially separated from each other according to wavelength and polarization so that the beamlets 38 comprise a plurality of desired substantially monochromatic beamlets 42 corresponding to the first and second polarization sub-components of the desired wavelength components of the input beam 32 and a plurality of unwanted substantially monochromatic beamlets 44 corresponding to the first and second polarization sub-components of the unwanted wavelength components of the input beam 32. Furthermore, each of the beamlets 38 is prepared in a linearly polarize state which enables the desired wavelength components of the input beam 32 to efficiency pass through the assembly 30 with high throughput as will be described in greater detail below.

As shown in FIG. 1, the assembly further comprises a filter section 46 disposed in the beam paths 40 so that the beamlets 38 enter the filter section. As will be described in greater detail below, the filter section 46 selectively attenuates the unwanted wavelength components of the input beam 32 by blocking the paths 40 of the unwanted beamlets 44. Furthermore, the filter section 46 selectively passes the desired wavelength components of the input beam by allowing the desired beamlets 42 to transmit through the filter section 46.

As shown in FIG. 1, the assembly 30 further comprises an output section 48 disposed in the path of the desired beamlets 42 exiting the filter section 46 so that the desired beamlets 42 enter the output section 48. As will be described in greater detail below, the output section 48 recombines the desired beamlets 42 with high throughput efficiency so as to form the output beam 34 which is substantially similar to the input beam 32 minus the unwanted wavelength components.

Figure 2:
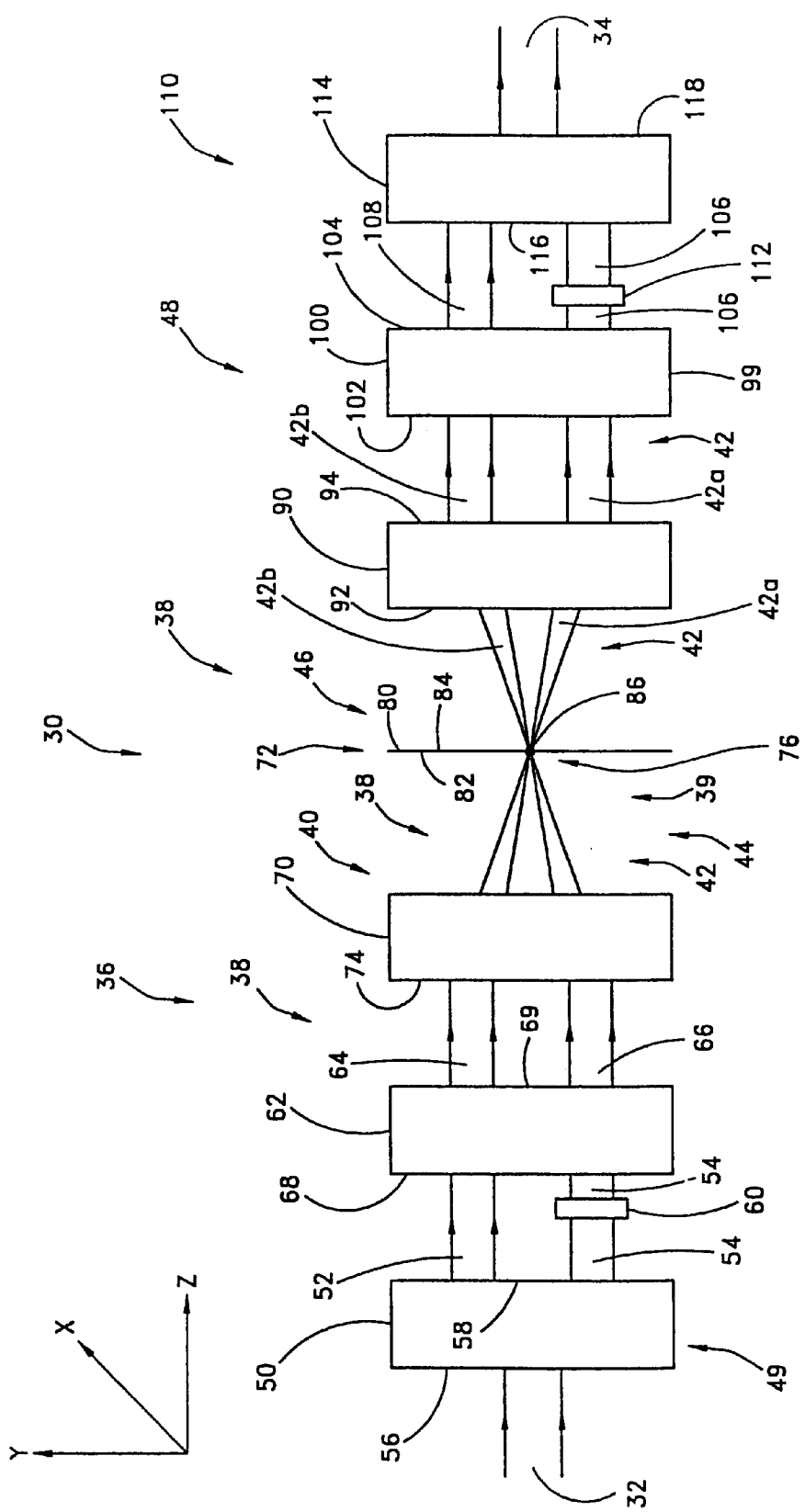
FIGS. 2 and 3 are schematic diagrams of the light filtering assembly of FIG. 1 illustrating the orthogonal aspects of a plurality of beam paths formed by the assembly.
Figure 3:
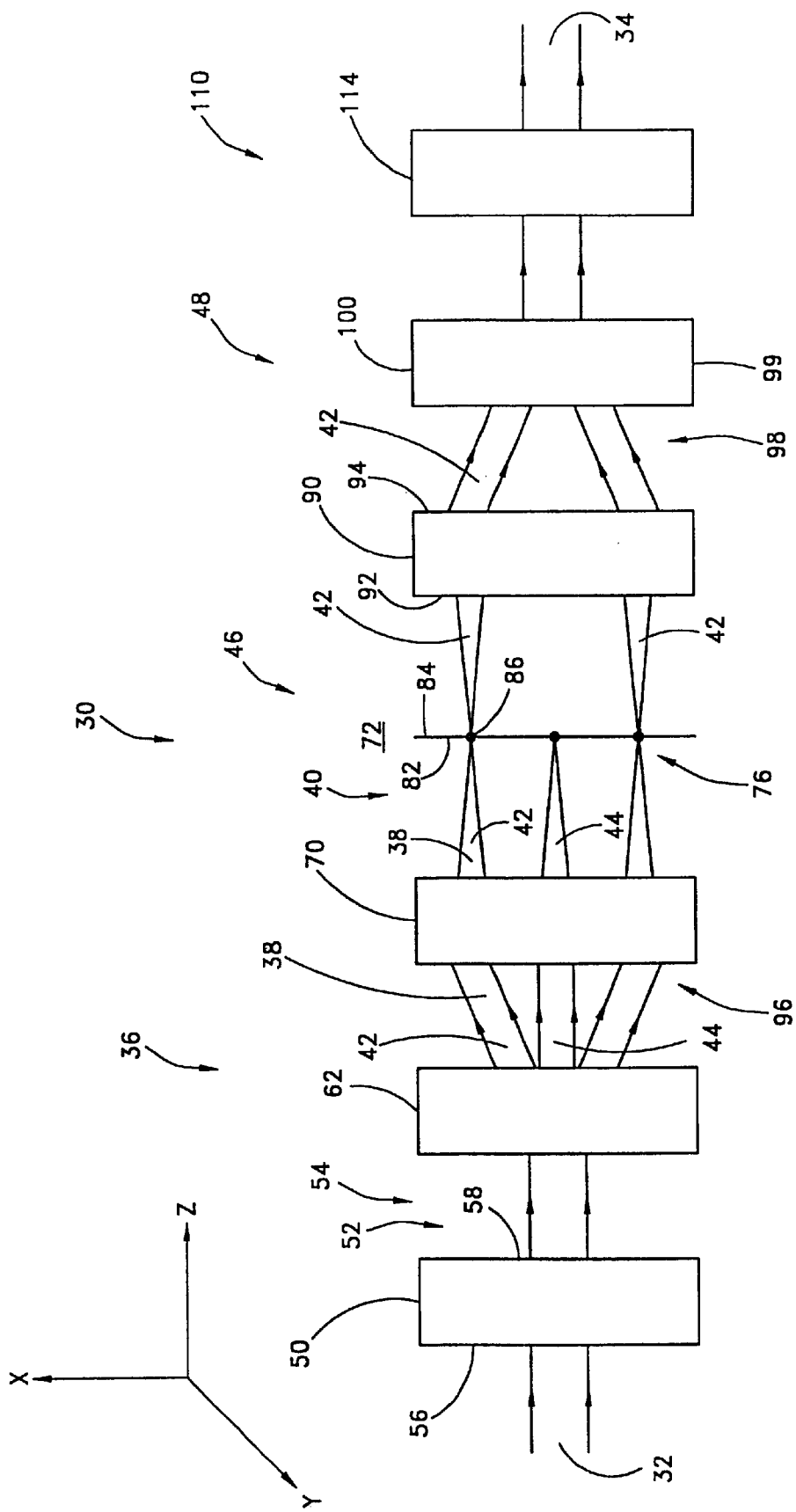

Reference will now be made to FIGS. 2 and 3 which schematically illustrate the light filtering assembly 30 of FIG. 1 in greater detail. The input beam 32, the output beam 34, and the plurality of intermediate beamlets 38 are illustrated as generally traveling along a z-axis. Furthermore, FIG. 2 illustrates the deflection of the beamlets 38 along a y-axis that is perpendicular to the z-axis so as to indicate the response of the assembly 30 to beam polarization. FIG. 3 illustrates the deflection of the beamlets 38 along an x-axis that is perpendicular to both the y-axis and the z-axis so as to indicate the response of the assembly 30 to beam wavelength.

However, it will be appreciated by a person skilled in the art that the light filtering system 30 could be arranged in any of a number of configurations. For example, the light filtering system could be configured in a non-linear manner such that the input beam 32, the output beam 34, and the intermediate beamlets 38 do not travel in similar directions. Furthermore, the assembly 30 could comprise light reflecting components instead of the light transmitting components schematically illustrated in FIGS. 2 and 3. Moreover, the system 30 could be configured so that the x, y, and z-axes are not mutually orthogonal.

As shown in FIGS. 2 and 3, the input section 36 of the light filtering assembly 30 comprises a polarization converter 49 that converts unpolarized light into linearly polarized light with high efficiency. As will be described in greater detail below in along an x-axis that is perpendicular to both the y-axis and the z-axis so as to indicate the response of the assembly 30 to beam wavelength into first and second linearly polarized output beams 52 and 54 having perpendicular axes of polarization. The input beam 32 traveling along the z-axis enters an input face 56 of the beamsplitter 50 and is split therein into the first and second polarized beams 52, 54 that exit an output face 58 of the beamsplitter 50 preferably in a substantially parallel manner along the z-axis such that the beams 52, 54 are offset from each other along the y-axis. The first polarized beam 52 is generated with a first axis of polarization and the second polarized beam 54 is generated with a second axis of polarization that is perpendicular to the first axis of polarization. In the preferred embodiment, the first polarized beam 52 is p-polarized such that the first axis of polarization is parallel to the output face 58 of the polarizing beamsplitter 50. Furthermore, the second polarized beam 54 is initially s-polarized such that the second axis of polarization is perpendicular to the output face 58 of the polarizing beamsplitter 50.

As shown in FIG. 2, the polarization converter 49 of the input section 36 of the assembly 30 further comprises a first ½ wave plate 60 disposed in the path of the first polarized beam 52 that exits the polarizing beamsplitter 50. The plate 60 receives the beam 52 and rotates the axis of polarization of the beam 52 so that the beam 52 exits the plate 60 with an axis of polarization aligned with that of the first polarized beam 54. Consequently, in the preferred embodiment, the first and second polarized beams 52, 54 are s-polarized which enables them be dispersed by a dispersing device 62 of the assembly 30 with large throughput efficiency.

As shown in FIGS. 2 and 3, the input section 36 of the assembly 30 further comprises the dispersing device 62 for dispersing the beams 52, 54 exiting the polarizing beamsplitter 50 according to wavelength. The dispersing device 62 converts the beams 52, 54 into the respective first and second pluralities of dispersed beamlets 64, 66 that collectively form the plurality of beamlets 38. The dispersing device 62 is disposed in the path of the beams 52, 54 so that the first polarized beam 52 exiting the polarization converter 49 enters an input face 68 of the dispersing device 62 and is dispersed therein along a plane that is parallel to the x-z plane so as to provide the second plurality of dispersed beamlets 64. Likewise, the second polarized beam 54 exiting the polarization converter 49 enters the input face 68 of the dispersing device 62 and is dispersed therein along a different plane that is parallel to the x-z plane so as to provide the second plurality of dispersed beamlets 66 that are offset from the first dispersed beamlets 64 along the y-axis as shown in FIG. 2. Moreover, the beamlets 38 exiting the dispersing device 62 are each substantially collimated such that the cross section of the beamlets 38 maintains a substantially uniform shape.

As will be described in greater detail below in connection with FIG. 5, in the preferred embodiment, the dispersing device 62 preferably comprises a diffraction grating. In the preferred embodiment, the grating is preferably aligned so that the axes of polarization of the first and second polarized beams are parallel to the plane of the grating. As a result, polarization dependent losses of the grating are reduced which enables the grating to realize an increased throughput efficiency.

As shown in FIGS. 2 and 3, the input section 36 of the light dispersing assembly 30 further comprises a focusing element 70 for focusing the plurality of beamlets 38 exiting the dispersing device 62 onto a common focal plane 72 that is parallel with the x-y plane. The focusing element 70 is disposed in the paths 40 of the plurality of beamlets 38 such that the beamlets 38 enter an input face 74 of the focusing element 70 in a diverging manner along planes that are parallel to the x-z plane. The focusing element 70 redirects the beamlets 38 so that their directions of travel are substantially aligned with planes that are parallel to the y-z plane. Furthermore, the focusing element 70 partially deflects the beamlets 38 along the y-axis so that corresponding beamlet pairs 39 that have matching wavelengths intersect each other in the focal plane 72 of the focusing device 70. Moreover, as shown in FIGS. 2 and 3, the focusing element 70 focuses each beamlet 38 so that each beamlet 38 has a reduced cross sectional width in the focal plane 72 of the focusing device 70.

Consequently, the input section 36 of the light dispersing assembly 30 converts the input beam 32 into the spatially separated plurality of beamlets 38 that are focused in the focal plane 72 of the focusing device 70 such that a substantially narrow elongated intensity pattern 76 is provided that extends along the x-axis as shown in FIG. 3. Because the dispersing element 62 spatially separates the beamlets 38 in the x-z plane in a wavelength dependent manner, the intensity pattern 76 is spectrally separated.

As shown in FIGS. 2 and 3, the filter section 46 of light dispersing assembly 30 is disposed so as to overlap the focal plane 72 of the focusing device 70. The filter section 46 comprises a spatial intensity modulator, that, in the preferred embodiment, is an opaque screen 80 having an input face 82, an output face 84, and a plurality of light transmitting regions 86, or apertures 86, extending therebetween such that the apertures 86 are spatially distributed along the x-axis. The screen 80 is positioned substantially in the focal plane 72 of the focusing device 70 such that the apertures 86 are aligned with the intensity pattern 76 produced by the spectrally separated beamlets 38. Furthermore, the apertures 86 are disposed so that portions of the intensity pattern 76 corresponding to the beamlets 42 having the desired wavelengths overlap the apertures 86 and such that portions of the intensity pattern 76 corresponding to the beamlets 44 having the unwanted wavelengths impinge on the opaque regions of the input face 82 of the screen 80.

Thus, the beamlets 44 having the unwanted wavelengths are blocked by the screen 80 and the beamlets 42 having the desired wavelengths are transmitted through the output face 84 of the screen 80 as shown in FIGS. 2 and 3. As shown in FIG. 3, the beamlets 42 exiting the screen 80 travel along planes that are parallel to the y-z plane. As shown in FIG. 2, the beamlets 42 originating from the first polarized beam 52, hereinbelow referred to as the beamlets 42a, are partially directed along the negative y-axis. Likewise, the beamlets 42 originating from the second polarized beam 54, hereinbelow referred to as the beamlets 42b, are partially directed along the positive y-axis so that the beamlets 42b diverge away from the beamlets 42a. Furthermore, the beamlets 42 each have a diverging profile such that their cross sectional areas increase as they travel away from the screen 80.

As shown in FIGS. 2 and 3, the output section 48 of the light filtering assembly 30 comprises a collimating element 90 having an input face 92 and an output face 94. The collimating element 90 is disposed in the path of the diverging beamlets 42 exiting the screen 80 so that the diverging beamlets 42 enter the input face 92 of the collimating element 90 with directions of travel that are substantially aligned with planes parallel to the y-z plane. The collimating element 90 then redirects the beamlets 42 so that the beamlets 42 exit the output face 94 of the collimating element 90 with directions of travel that are substantially aligned with planes that are parallel to the x-z plane. Within these parallel planes, the beamlets 42a converge toward each other and the beamlets 42b converge toward each other such that the convergence of the beamlets 42a, and 42b occurs in an intersecting plane 99 that is parallel to the x-y plane. The collimating element 90 further modifies the beamlets 42 so that each beamlet 42 exits the output face 94 of the collimating element 90 with the collimated profile.

As shown in FIGS. 2 and 3, the output section 48 of the light filtering assembly 30 further comprises a first beam combining element 100 having an input face 102 and an output face 104. The element 100 is disposed in the plane of intersection 99 so that the element 100 is in the path of the intersecting beamlets 42. The beamlets 42 enter the input face 102 of the element 100 and recombine therein in a manner that will be described in greater detail below. The recombination of the beamlets 42 produces first and second recombined beams 106, 108 that respectively originate from the first and second pluralities of beamlets 42a and 42b. The recombined beams exit the output face 104 of the element 100 and travel in substantially parallel directions along the z-axis such that the first recombined beam 106 is offset from the second recombined beam 108 along the y-axis. Since the recombined beams 106, 108 originate from the s-polarized beams 52, 54, in the preferred embodiment, the recombined beams 106, 108 are both initially s-polarized.

As shown in FIGS. 2 and 3, in the preferred embodiment, the output section further comprises a depolarization converter 110 for converting the polarized beams 106, 108 into the single unpolarized output beam 34. The depolarization converter 110 comprises a second ½ wave plate 112 that is positioned in the path of the second recombined beam 108. The second plate 112, which is substantially identical to the first plate 60, rotates the axis of polarization of the second recombined beam 108 by ninety degrees. As a result, in the preferred embodiment, the second recombined beam 108 exits the plate 112 with p-polarization.

As shown in FIGS. 2 and 3, the depolarization converter 110 of the output section 48 of the light filtering assembly 30 further comprises a second beam combining element 114 that combines p-polarized light with s-polarized light to generate unpolarized light. The element 114 having an input face 116 and an output face 118 is disposed in the path of the recombined beams 106, 108 so that the beams 106, 108 enter the input face 116 of the second beam combining element 114. Upon entering the element 114, the beam 106, 108 are recombined in a manner that will be described in greater detail below so as to provide the output beam 34 that exits the output face 118 of the element 114.

Figure 4:
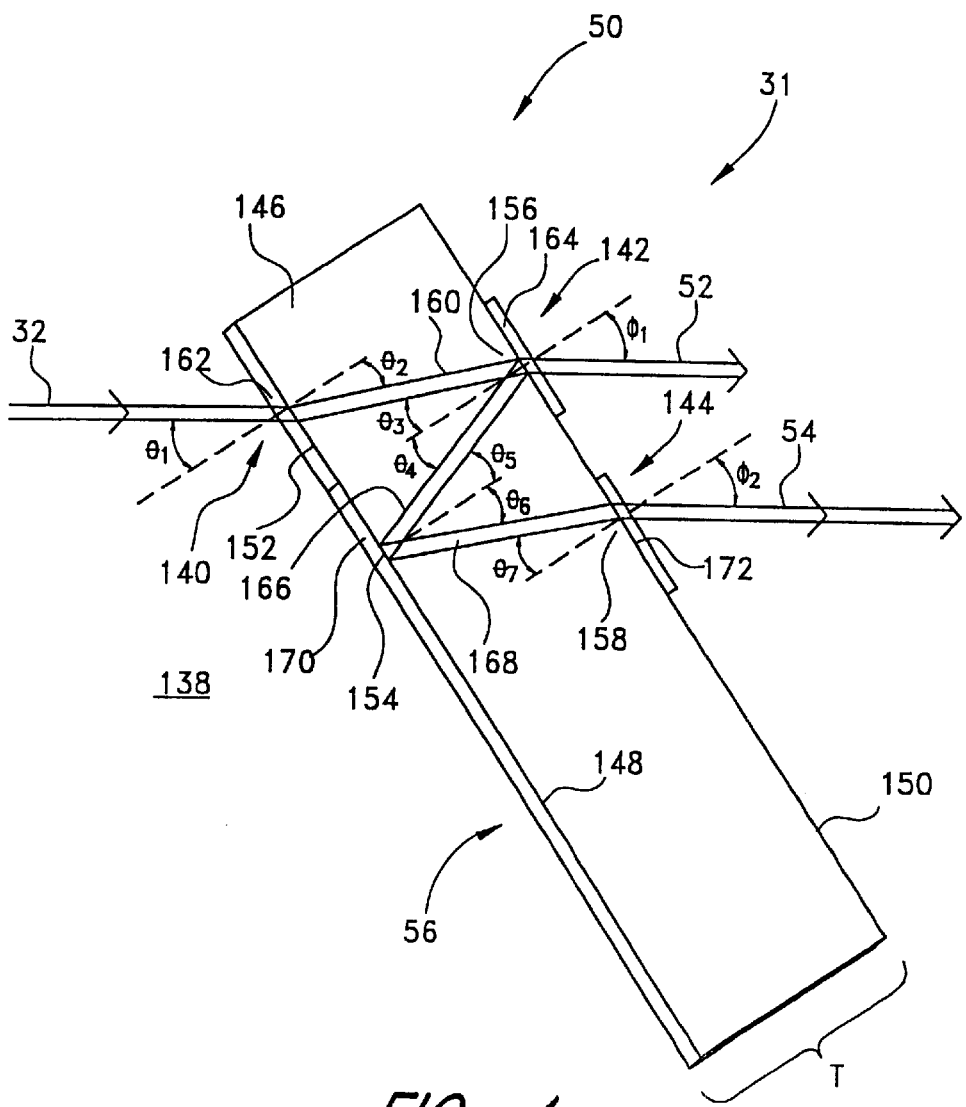
FIG. 4 is a schematic diagram of a polarizing beamsplitter device of the light filtering assembly of FIG. 1 that is adapted to convert unpolarized light into substantially parallel first and second polarized beams having orthogonal axes of polarization.

Reference will now be made to FIG. 4 which schematically illustrates one embodiment of the polarizing beamsplitter 50 of the light filtering device 30 in greater detail. As shown in FIG. 4, the beamsplitter 50 has the input face 56 with an input face portion 140 and the output face 58 comprised of at least two output face portions 142, 144. These faces are formed by a sheet 146 of transparent material having a thickness T that provides structural rigidity. The sheet 146 includes first and second planar surfaces 148, 150 disposed in substantially parallel respective planes.

The input beam 32 enters the input face portion 140 of the beamsplitter 50 and undergoes refraction at a first refracting region 152 so as to provide a first refracted beam 160. The input beam 32 defines a first incident angle $\theta_1$ with respect to a line normal to the first surface 148 of the sheet 146. Furthermore, the first refracted beam 160 defines a first refracted angle $\theta_2$ with respect the line normal to the second surface 150 according to the equation:

$$n_{out} \sin \theta_1 = n_{in} \sin \theta_2 \qquad (1)$$

wherein $n_{out}$ is the index of refraction of the exterior medium 138 adjacent the beamsplitter 50 and $n_{in}$ is the index of refraction of the sheet 146.

In one embodiment, the input face portion 140 comprises a first relatively thin antireflective coating 162 disposed along the first refracting region 152 of the first surface 148. The purpose of the first antireflective coating 162 is to enhance transmission of the input beam 32 through the first refracting region 152.

The first refracted beam 160 travels through the sheet 146 and enters a polarizing region 156 of the second surface 150 so as to define a second incident angle $\theta_3$ with respect to a line normal to the second surface 150 of the sheet 146. Since the first and second surfaces 148, 150 of the sheet 146 are substantially parallel to each other, the second incident angle $\theta_3$ is substantially equal to the first refracted angle $\theta_2$.

The output face portion 142 comprises a polarizing coating 164 which is disposed along the polarizing region 156 of the second surface 150. The polarizing coating 164 transmits a linearly polarized beam having the first polarization that enters the coating 164 with the second incident angle $\theta_3$. Furthermore, the polarizing coating 164 reflects a similarly directed second linearly polarized beam having the second polarization. In one embodiment, the polarizing coating 164 is adapted to transmit p-polarized light and reflect s-polarized light.

Consequently, the first polarized component of the first refracted beam 160 exits the beamsplitter 50 through the first output face portion 142 so as to provide the first polarized beam 52 having the first polarization. In particular, the beam 52 exits the first output face portion 142 so as to define a first output angle $\phi_1$ with respect to a line normal to the second surface 150 of the wall 146 according to the equation:

$$n_{in} \sin \theta_3 = n_{out} \sin \phi_1 \qquad (2)$$

Furthermore, according to equations (1) and (2) and the substantial equality of the angles $\theta_3$ with $\theta_2$, the first output angle $\phi_1$ is substantially equal to the first incident angle $\theta_1$.

As shown in FIG. 4, the second polarized component of the first refracted beam 160 reflects off of the polarizing coating 164 so as to provide a first reflected beam 166 having the second polarization that defines a first reflected angle $\theta_4$ with respect to the line normal to the second surface 150 of the sheet 146. Furthermore, according to the law of reflection, the first reflected angle $\theta_4$ is equal to the second incident angle $\theta_3$.

As shown in FIG. 4, the first reflected beam 166 travels through the sheet 146 to a reflecting coating 170 disposed on a reflecting region 154 disposed along the first surface 148 of the sheet 146. The first reflected beam 166 defines a third incident angle $\theta_5$ with respect to a line normal to the first surface 148 of the wall 146. Since the first and second surfaces 148, 150 of the wall are substantially parallel to each other, the third incident angle $\theta_5$ is substantially equal to the first reflected angle $\theta_4$.

The first reflected beam 166 having the second polarization reflects off of the reflecting region 154 of the first surface 148 so as to provide a second reflected beam 168 having the second polarization that defines a second reflected angle $\theta_6$ with respect to the line normal to the first surface 148 of the sheet 146. According to the law of reflection, the second reflected angle $\theta_6$ is equal to the third incident angle $\theta_5$. The second reflected beam 168 travels through the sheet 146 to the second output face portion 144 where it is incident on a second refracting region 158 of the second surface 150 of the sheet 146. The beam 168 defines a fourth incident angle $\theta_7$ with respect to the second surface 150 of the sheet 146. Since the first and second surfaces 148, 150 are substantially parallel to each other, the fourth incident angle $\theta_7$ is substantially equal to the second reflected angle $\theta_6$. Consequently, the fourth incident angle $\theta_7$ is substantially equal to the first refracted angle $\theta_2$ The second reflected beam 168 is refracted at the second refracting region 158 of the second surface 150 adjacent the second output face portion 144 so as to provide the second polarized beam 54 having the second polarization. The beam 54 exits the second output face portion 144 so as to define a second output angle $\phi_2$ with respect to a line normal to the second surface 150. In particular, the beam 54 is refracted according to the equation:

$$n_{in} \sin \theta_6 = n_{out} \sin \phi_2 \qquad (3)$$

According to equations (1) and (3) and the substantial equality of the angles $\theta_6$ with $\theta_2$, the second output angle $\phi_2$ is substantially equal to the first incident angle $\theta_1$. Therefore, the beams 52, 54 are substantially parallel to each other.

In one embodiment, the polarizing coating 164 is adapted to transmit p-polarized light having an axis of polarization that is parallel to the plane of the coating 164. Furthermore, the coating 164 is adapted to reflect s-polarized light having an axis of polarization that is perpendicular to the plane of the coating 164. In this embodiment, the first polarized beam 52 is p-polarized and the second polarized beam 54 is s-polarized.

In one embodiment, the known reflective coating 170 is disposed along the reflecting region 154 of the first surface 148 of the sheet 146 so as to provide a relatively high reflectivity. Consequently, most of the energy of the first reflected beam 166 is reflected into the second reflected beam 168. Furthermore, in one embodiment, a second antireflective coating 172 is disposed along the second refracting region 158 of the second surface 150. The purpose of the antireflective coating 172 is to inhibit reflection and enhance refraction at the second refracting region 158.

In one embodiment, the sheet 146 is comprised of substantially rigid glass, such as BK7, manufactured by Schott Glass which is a German corporation, having an index of refraction approximately equal to 1.5. In particular, the sheet 146 is formed so that the first and second surfaces 148, 150 are parallel to within 0.5 seconds. As a result, the beams 52, 54 are parallel to each other to within 0.75 seconds. Furthermore, since the sheet 146 is substantially rigid, the high degree of parallelism of the beams 52, 54 is substantially unaffected by external vibrations.

Thus, it will be appreciated that the polarizing beamsplitter 50 provides many advantages when compared with polarizing beamsplitter devices known in the art. In particular, since the parallelism of the output beams 52, 54 is mainly determined by the parallelism of the first and second surfaces 148 and 150 of the sheet 146 and since the parallelism of prior art devices is determined by the alignment of separately mounted components, the beamsplitter 50 is able to provide the output beams 52, 54 with a degree of parallelism which is substantially greater than that of prior art devices. Furthermore, the beamsplitter 50 is able to realize such parallelism without requiring a complicated alignment procedure. Moreover, since the geometry of the beamsplitter 50 is substantially unaffected by external influences, the beamsplitter 50 will always provide the output beams 52, 54 with substantially parallel directions. Additionally, the beamsplitter 50 is bi-directional such that it can be used to create a plurality of output beams from one input beam and can also be used to combine a plurality of input beams into one output beam.

Figure 5:
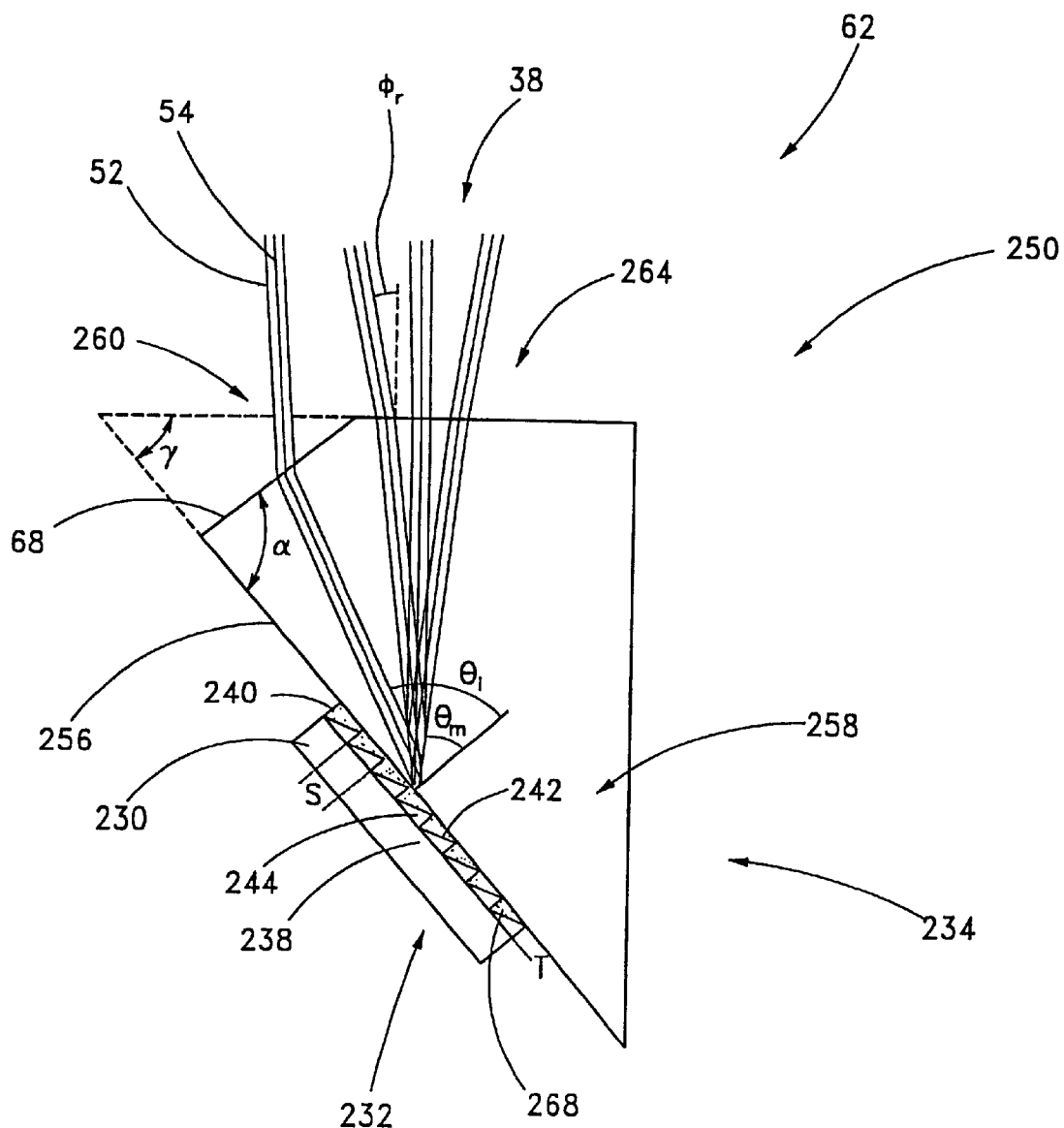
FIG. 5 is a schematic diagram of a light dispersing device of the light filtering assembly of FIG. 1 that is adapted to provide substantially stable dispersing characteristics in response to a change in temperature.

Reference will now be made to FIG. 5 which schematically illustrates one embodiment of the light dispersing element 62 of the light filtering assembly 30 in greater detail. The element 62 comprises a diffraction grating 232 attached to a dispersive mounting element 234. In one embodiment, the mounting element 234 is a prism 234. The element 62 is adapted to receive the polychromatic input beams 52 and 54 at the input face 68 and provide the corresponding plurality of beamlets 38 that exit the output face 69 of the element 62 with wavelength dependent exit angles $\phi_r$. Furthermore, the grating 232 is adapted to provide the light dispersing element 62 with first dispersing characteristics and the prism 234 is adapted to provide the light dispersing element 62 with second dispersing characteristics so that the grating 232 and the prism 234 combine to provide the light dispersing element 62 with combined dispersing characteristics having improved thermal stability.

As shown in FIG. 5, in one embodiment, the grating 232 of the light dispersing element 62 comprises a generally planar substrate 230 having a first broad surface 238 and a contoured layer 240 having a contoured surface 242 such that the contoured layer 242 extends from the surface 238 of the substrate 230. The contoured surface 242 includes a plurality of narrow grooves 244 which are illustrated in FIG. 5 in an exaggerated manner. The grooves 244 are separated by a relatively small groove spacing s as measured along the plane of the substrate 230. The contoured surface 242 is formed with substantial reflectivity so that the grating 232 functions as a reflecting device.

In one embodiment, the grating 232 is formed using conventional replication techniques such that a mold derived from a master grating is used to imprint the replicated grating 232 with the contoured surface 242 having the plurality of parallel grooves 244. To avoid having the most intense interference maximum associated with the grating 232 be the zeroth-order for which there is no dispersion of light, the grating 232 is preferably blazed to the first order (m=−1). Consequently, the surface of each groove 244 is angled with respect to the plane of the substrate 236. However, it will be appreciated that other types of gratings could be used in other embodiments. For example, non-blazed gratings, holographic gratings, and transmission gratings could be used.

In the preferred embodiment, the diffraction grating 232 is adapted to diffract light in a manner consistent with that of conventional diffraction gratings so as to provide the light dispersing element 162 with the first dispersing characteristics. The diffraction grating 232 is adapted to redirect an input beam having a free space wavelength $\lambda_f$, i.e. the wavelength of the beam as measured in a vacuum, and an incident angle $\theta_i$ with respect to the plane of the diffraction grating so that each output beam is provided with a diffracted angle $\theta_m$ according to equation (6) discussed below. Since the grating is preferably blazed to the first order, the ratio of the diffracted light energy over the incident light energy, otherwise known as the diffraction efficiency, is enhanced for the m=−1 diffraction order.

As shown in FIG. 5, the prism 234 of the light dispersing element 62 includes a plurality of generally planar refracting surfaces 250. The refracting surfaces 250 comprise the input face 68, the output face 69, and a mounting surface 256 such that an entrance angle $\alpha$ is defined by the input surface 68 and the mounting surface 256 and such that an exit angle $\gamma$ is defined by the output face 69 and the mounting surface 256. The input face 68 of the prism 234 serves as an input port 260 for the light dispersing element 62 so as to enable the beams 52, 54 to enter the light dispersing device therethrough. The output face 69 of the prism 234 serves as an output port 264 for the light dispersing element 62 so as to enable the plurality of beamlets 38 to exit therefrom with wavelength dependent directions. The prism 234 is formed of a transparent material providing an index of refraction $n_p$ that depends on the wavelength of light traveling therethrough.

As shown in FIG. 5, in the preferred embodiment, the grating 232 is mounted directly to the mounting surface 256 of the prism 234 so as to provide the light dispersing element 62 with a diffracting face 258. The grating 232 is positioned adjacent the mounting surface 256 of the prism 234 so that the plane of the substrate 236 of the grating 232 is substantially parallel to the plane of the mounting surface 256 of the prism 234. The contoured surface 242 of the grating 232 is positioned adjacent the mounting surface 256 so that the contoured surface 242 is the diffracting face 258. A relatively thin layer of transparent epoxy 268 having a thickness T is interposed between the grating 232 and the prism 234 in a flush manner such that the epoxy 268 bonds to the contoured surface 242 of the grating 232 and the mounting surface 256 of the prism 234. The epoxy 268 is preferably formed with an index of refraction substantially equal to the index of refraction of the prism 234 so as to prevent light from reflecting at the mounting surface 256.

Although the preferred embodiments of the light dispersing element 62 utilize the separately formed grating 232 which is mounted to the prism 234 as shown in FIG. 5, it will be appreciated that, in another embodiment, an alternative diffracting face could be provided. For example, in one embodiment, the surface 256 of the prism 234 could be contoured in the manner of the contoured surface 242 of the grating 232 of FIG. 5.

Figure 6:
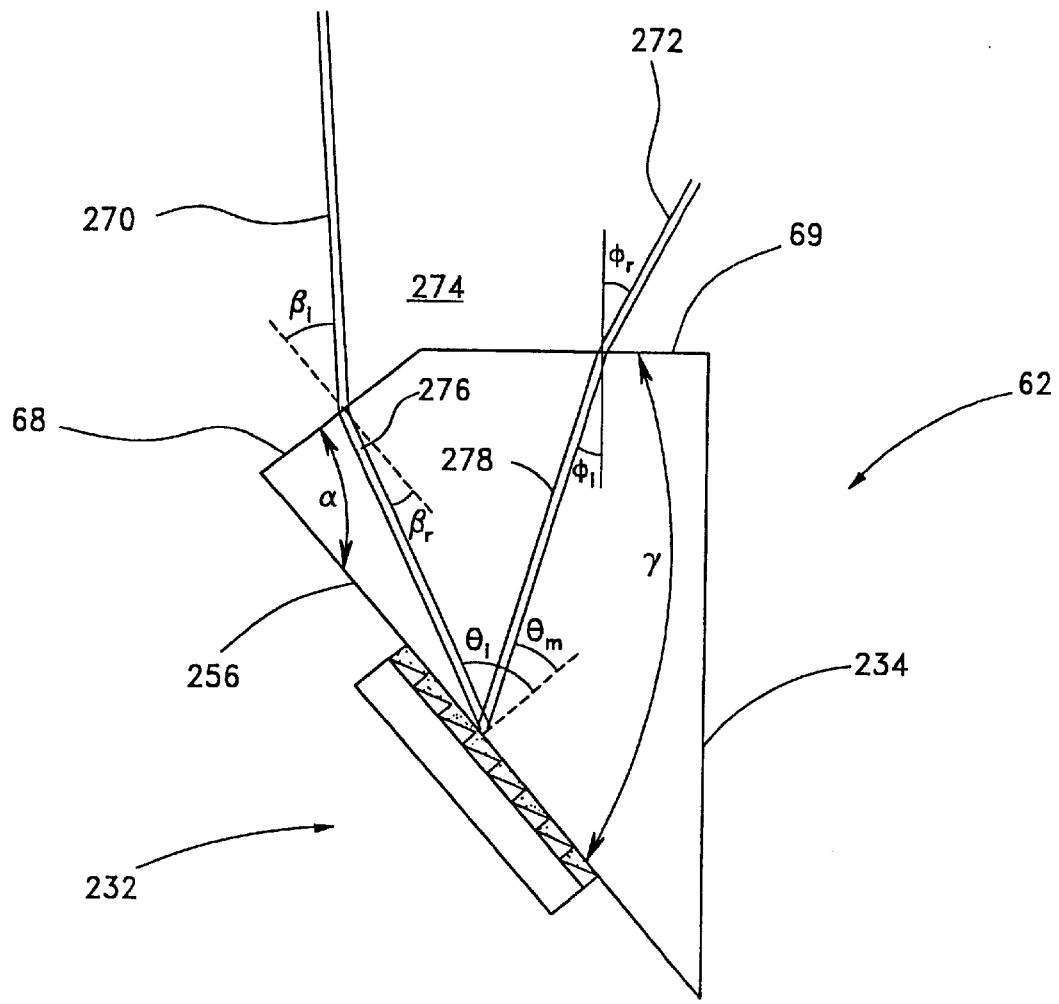
FIG. 6 is a schematic diagram illustrating a monochromatic input beam being redirected by the dispersing device of FIG. 5 in a wavelength dependent manner.

Reference will now be made to FIG. 6 which illustrates the combined dispersing characteristics of the light dispersing element 62. In this simplified example, a monochromatic input beam 270 having a freespace wavelength $\lambda_f$ is directed toward the input face 68 of the light dispersing element 62. The input beam 270 is then redirected by the element 62 so that an output beam 272 with the same freespace wavelength $\lambda_f$ exits the output face 69 of the element 62, thereby defining the exit angle $\phi_r$ with respect to a line normal to the output face 69.

As shown in FIG. 6, the input beam 270 is directed through an incident medium 274, such as air, having an index of refraction $n_i$ toward the input face 68 of the prism 234 so as to define a first incident angle $\beta_i$ with respect to a line normal to the input face 68. Upon reaching the input face 68, the input beam 270 undergoes refraction, thus providing a first refracted beam 276 according to the equation:

$$n_i \sin \beta_i = n_p \sin \beta_r \qquad (4)$$

wherein $\beta_r$ is the angle of refraction with respect to the line normal to the input face 68.

As shown in FIG. 6, the refracted beam 276 is directed through the prism 234 toward the grating 232 disposed along the mounting surface 256. The beam 276 approaches the mounting surface 256 so as to define a second incident angle $\theta_i$ with respect to a line normal to the plane of the mounting surface 256. The angle $\theta_i$ is related to $\beta_r$ and the entrance angle of the prism, $\alpha$, according to the geometric equation:

$$\theta_i = \alpha - \beta_r \qquad (5)$$

As shown in FIG. 6, the diffraction grating 232 diffracts the beam 276 into a diffracted beam 278 that reenters the prism 234 through the mounting surface 256. The diffracted beam 278 defines a diffraction angle $\theta_m$ with respect to a line normal to the mounting surface 256 according to the well known diffraction grating equation, which in this situation (diffraction order m=−1) is expressed as:

$$s(\sin\theta_i + \sin\theta_m) = \frac{-\lambda_f}{n_p} \quad (6)$$

As shown in FIG. 6, the diffracted beam 278 travels through the prism 234 before exiting the output face 69 of the prism 234, thus defining a third incident angle $\phi_i$ with respect to a line normal to the output face 69. The angle $\phi_i$ is related to $\theta_m$ and the exit angle of the prism, $\gamma$, according to the geometric equation:

$$\phi_i = \gamma - \theta_m \quad (7)$$

The diffracted beam 278 undergoes refraction at the output face 69, thus providing the output beam 272 according to the equation:

$$n_p \sin(\phi_i) = n_r \sin(\phi_r) \quad (8)$$

wherein $n_r$ is the index of refraction of the medium adjacent the output surface 254 and outside the prism 234. In the preferred embodiment, the medium adjacent the output face 69 is air.

According to equations (4)–(8), it is apparent that the exit angle $\phi_r$ depends on the first incident angle $\beta_i$, the index of refraction of the prism $n_p$, the input angle $\alpha$ of the prism, the groove spacing s of the grating, the exit angle $\gamma$ of the prism, and the free space wavelength $\lambda_f$ of the output beam. This explains why the beams 52, 54 of FIG. 5 are dispersed into the corresponding plurality of monochromatic beamlets 38 each having a unique exit angle $\phi_r$. However, since $n_p$ and s often vary in response to a change in temperature, it is likely that the exit angles $\phi_r$ would vary in a substantial manner if not for the thermally compensating design features of the light dispersing element 62 which will now be described in greater detail.

To reduce the variance of the exit angles $\phi_r$ of the light dispersing element 62 in response to a change in temperature, in one embodiment, the light dispersing element 62 is adapted so that the effects of thermally induced changes in $n_p$ are reduced by the effects of thermally induced changes in s. More particularly, according to equations (4)–(8), the light dispersing element 62 is formed of materials selected so that the rate of change of the index of refraction of the prism 234 with respect to a change in temperature (dn/dT), and the rate of change of the groove spacings of the grating 232 with respect to a change in temperature (ds/dT) provide a relatively small rate of change of the exit angle $\phi_r$ with respect to a change in temperature ($d\phi_r/dT$).

For example, in one embodiment, the grating 232 is adapted to have desired values of ds/dT by applying temperature dependent stresses on the contoured layer 240. Such stresses may be the result of thermal expansion of the light dispersing element 62. More particularly, ds/dT of the contoured layer 240 can be selected by choosing the material of the contoured layer 240 with an appropriate coefficient of thermal expansion (CTE). The term ds/dT is further defined by the thermal stresses which act on the contoured layer 240. For example, since the contoured layer 240 is directly adhered to the substrate 236, the substrate 236 can be adapted to exert a thermal stress on the contoured layer 240 that depends on the CTE of the substrate 236. Since the contoured layer 240 is directly adhered to the epoxy 268, the epoxy 268 can be adapted to exert a thermal stress on the contoured layer that depends on the CTE of the epoxy. Additionally, since the prism 234 is adhered to the epoxy 268, the prism 234 can be adapted to indirectly exert a thermal stress on the contoured layer 240 through the epoxy 268, wherein the thermal stress exerted on the contoured layer 240 depends on the elastic modulus of the epoxy 268, the thickness of the epoxy 268, and the CTE of the prism 238.

In one embodiment, the groove spacing s of the grating 232 is maintained at a relatively constant value in response to a change in temperature. This is accomplished by selecting the material of the substrate 236 with a relatively small CTE. In one embodiment, the epoxy 268 is formed of highly elastic material with a sufficient thickness so that the grating 232 is essentially isolated from the thermal expansion of the prism 234. The material of the prism 234 may be selected so as to have a relatively small CTE.

In one embodiment, the light dispersing element 62 is formed so that ds/dT of the grating 232 is substantially zero and so that dn/dT of the prism is substantially non-zero. To provide thermal compensation, the light dispersing element 62 is formed with appropriate values of $\alpha$, $\gamma$ and $n_p$ so that the effects of the substantially non-zero dn/dT on $\phi_r$ are substantially nullified according to equations (4)–(8). For example, if the index $n_p$ of the prism increases, then the refracted angle $\beta_r$ decreases according to equation (4) and the incident angle $\theta_i$ decreases according to equation (5). Correspondingly, the diffracted angle $\theta_m$ is enlarged according to equation (6) and the incident angle $\phi_i$ is reduced according to equation (7). The reduction in $\phi_i$ is selected so that the product of $n_p$ times $\sin(\phi_i)$ is relatively unchanged so that $\phi_r$ is substantially maintained according to equation (8).

Thus, it will be appreciated that a person skilled in the art has substantial latitude in designing the light dispersing element 62 so that $d\phi_r/dT$ is reduced. In one embodiment, the material and shape of the light dispersing device is selected so that the effects of a non-zero ds/dT offset the effects of a non-zero dn/dT. In another embodiment, the light dispersing device is adapted with a substantially zero ds/dT and a substantially non-zero dn/dT such that $\phi_r$ is relatively unchanged by the changing $n_p$.

Thus, it will be appreciated that the light dispersing element 62 is able to disperse light in a manner that is more desirable than that of dispersing devices known in the art. By countering the effects of the thermally dependent index of refraction of the prism 234 with the effects of the thermally dependent groove spacings of the grating 232, the exit angles $\phi_r$ of the light dispersing element 62 are less sensitive to a change in temperature. Furthermore, in one embodiment, the light dispersing element 62 is adapted so that the groove spacing s of the grating 232 is relatively insensitive to a change in temperature and so that the index of refraction $n_p$ of the grating 232 is substantially affected by a change in temperature. However, in this embodiment, the composition and shape of the prism 234 is selected so that the exit angles $\phi_r$ of the beamlets 38 are substantially independent of the temperature of the light dispersing element 62.

Figure 7:
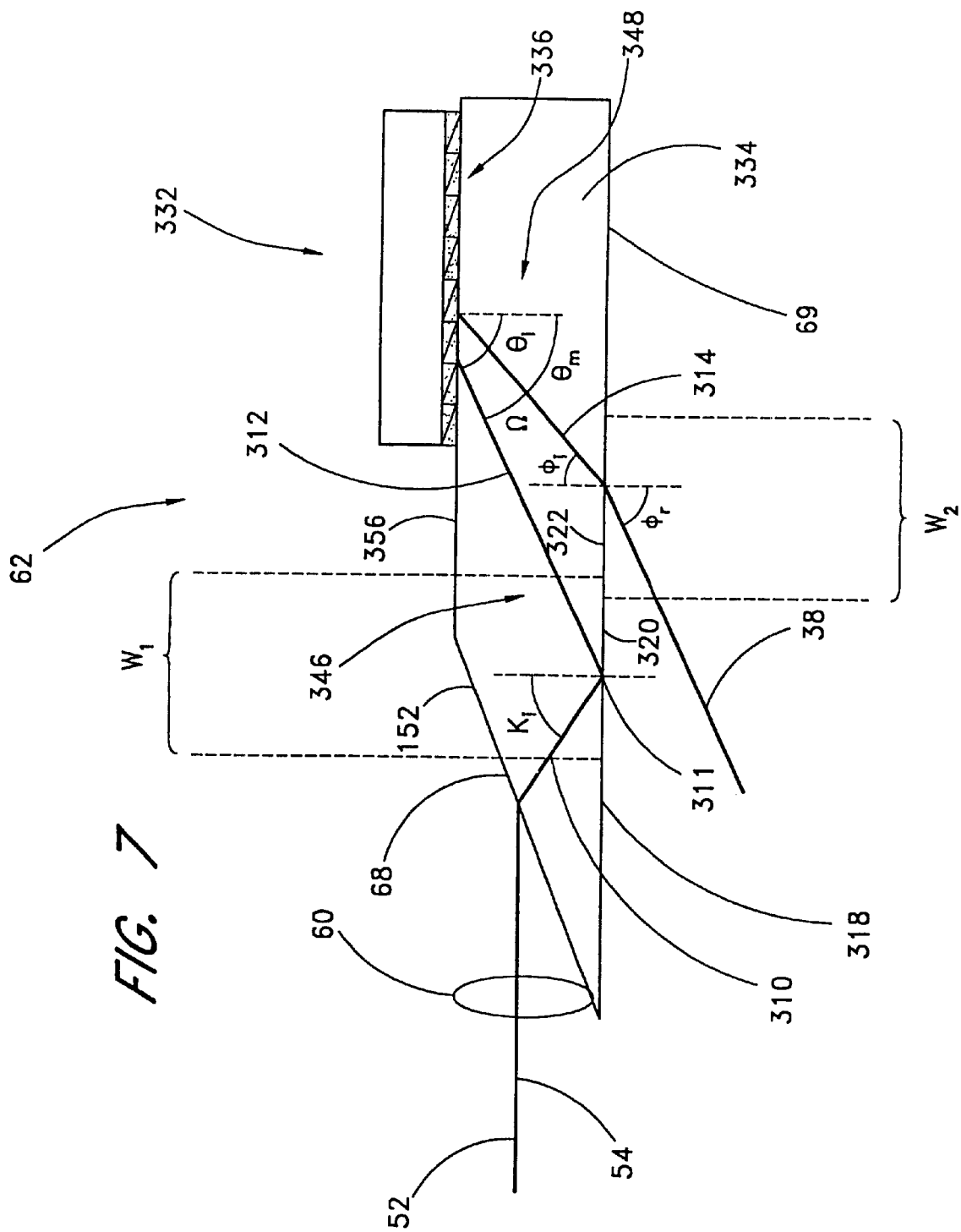
FIG. 7 is a schematic diagram of another embodiment of a light dispersing device of the light filtering assembly of FIG. 1 that is adapted to provide improved throughput efficiency.

Reference will now be made to FIG. 7 which schematically illustrates another embodiment of the dispersing element 62 of the light filtering assembly 30. In this embodiment, the light dispersing element is adapted to provide an improved throughput efficiency by reducing the angular separation between incident and diffracted beams entering and exiting a diffraction grating 332 of the dispersing element 62.

As shown in FIG. 7, the element 62 is similar to the element 62 of FIG. 5. In particular, the element 62 comprises a prism 334 having the input face 68, the output face 69 and a mounting surface 356. The element 62 further comprises the diffraction grating 332 similar to that of FIG. 5 so as to provide a diffracting face 336. In particular, the grating 332 is mounted to the mounting surface 356 of the prism 334 such that the beams 52, 54 impinging on the input face 68 of the prism 334 is subsequently diffracted by the diffraction grating 332 so as to provide the beamlets 38 that exit the output face 69. Furthermore, the element 62 is adapted with the thermally compensating features described previously in connection with the element 62 of FIG. 5 so as to provide substantially uniform dispersing characteristics in response to a change in temperature. However, as will be described in greater detail below, the element 62 of FIG. 6 defines input and output beam paths 346, 348 within the prism 334 such that improved diffraction efficiency of the grating 332 is realized.

As shown in FIG. 7, the prism 334 is adapted so that the beams 52, 54 entering the input face 68 of the prism 334 travels within the prism 334 from the input face 68 to the mounting surface 356 along the input beam paths 346. In particular, each input beam path 346 comprises a first length 310 that extends toward a reflecting location 311 positioned within the prism 334. Each input beam path 364 further comprises a second length 312 that extends from the reflecting location 311 toward the diffracting face 336 so that the beams 52, 54 define incident angles $\theta_i$ with respect to a line normal to the diffracting face 336.

In one embodiment, reflection of the beams 52, 54 at the reflecting location 311 occurs as a result of total internal reflection (TIR). In particular, the first length 310 of each input beam path 346 extends toward a first exterior surface 318 of the prism 334 and defines an incident angle $\kappa_i$ with respect to a line normal to the first surface 318. The prism 334 is adapted so that the incident angle $\kappa_i$ is greater than the critical angle at the first surface 318 defined by:

$$\sin^{-1}(n_p/n_{out})$$

wherein $n_{out}$ is the index of refraction of the medium outside the prism 334 adjacent the first surface 318 and wherein $n_p$ is the index of refraction of the prism 334.

As shown in FIG. 7, the first length 310 of each input beam path 346 extends from the input face 68 to the output face 69. Upon reaching the output face 69, the beam 52, 54 undergoes TIR thereat so as to be redirected along the second lengths 312 of the input beam paths 346 that extend from the output face 69 toward the mounting surface 356.

The prism 334 is adapted so that the beamlets 38 originating at the diffracting face 336 travels within the prism 334 from the diffracting face 336 to the output face 69 along the output beam paths 348. Each output beam path 348 comprises a first length 314 that extends from the mounting surface 356 to the output face 69 along a direction defined by the diffraction angle $\theta_m$ with respect to the diffracting face 336 according to equation (6). The first length 314 of each output beam path 348 further defines an incident angle $\phi_i$ with respect to the output face 69. The incident angle $\phi_i$ defined by each output beam path 348 at the output face 69 is less than the critical angle so that TIR does not occur. In one embodiment, an anti-reflective coating is deposited along the output face 69 of the prism 332 so as to enhance transmission of the beamlets 38 through the output face 69 without frustrating the TIR of the beams 52, 54.

The element 62 is adapted so that the second length 312 of each input beam path 346 and the first length 314 of each output beam path 348 define an angle $\Omega$ which is relatively small. In one embodiment, $\Omega$ is less than 5 degrees. Since the angle $\Omega$ is smaller than that which is typically provided by prior art devices, the diffraction grating 332 is able to realize an improved diffraction efficiency. Furthermore, since the beams 52, 54 and the beamlets 38, respectively enter and exit the element through the spatially separated input and output faces 68, 69 the beams 52, 54 and the beamlets 38 are less likely to be affected by closely positioned components.

For example, in one embodiment, the ½ wave plate 60 is positioned adjacent the input face 68 of the element 62 so as to be positioned in the path of the beam 52 as shown in FIG. 7. However, since the beamlets 38 exit the output face 69 and travel therefrom along a region which is substantially separated from the input face 68, the beamlets 38 do not enter the plate 60. Consequently, the at least one of the beamlets 38 are not affected by the plate 60.

In one embodiment, the element 62 is adapted so that at least one of the beams 52, 54 and the beamlets 38 having ellipsoidal cross sectional shapes partially overlap each other at the output face 69 of the prism 334. Because the input beam 52, 54 has an extended width, it strikes the output face 69 along a first incident region 320 having a width $W_1$. Likewise, because the output beamlet 38 has an extended width, it strikes the output face 69 along a second incident region 322 having a width $W_2$. Since the angle $\Omega$ between the input beam 52, 54 and the output beamlet 38 is relatively small, the second incident region 322 partially overlaps the first incident region 320 as shown in FIG. 4.

Thus, it will be appreciated that the light dispersing element 62 of FIG. 7 provides the advantage of increased throughput efficiency. This advantage is realized by providing the input and output beam paths 346, 348 that define relatively small angles $\Omega$ at the diffracting face 336 which increases the diffraction efficiency of the grating 332. For example, it has been determined that the diffraction efficiency of the diffraction grating 332 can increase by as much as 10% if the angle $\Omega$ is reduced from 15° down to 5°. Furthermore, this advantage is realized without requiring the input beams 52, 54 and the output beamlets 38 to pass nearby each other outside of the prism 334. Consequently, the element 62 can be used in conjunction with ½ wave plate 60 such that the plate 60 influences the beam 52 without influencing the beamlets 38.

Figure 8:
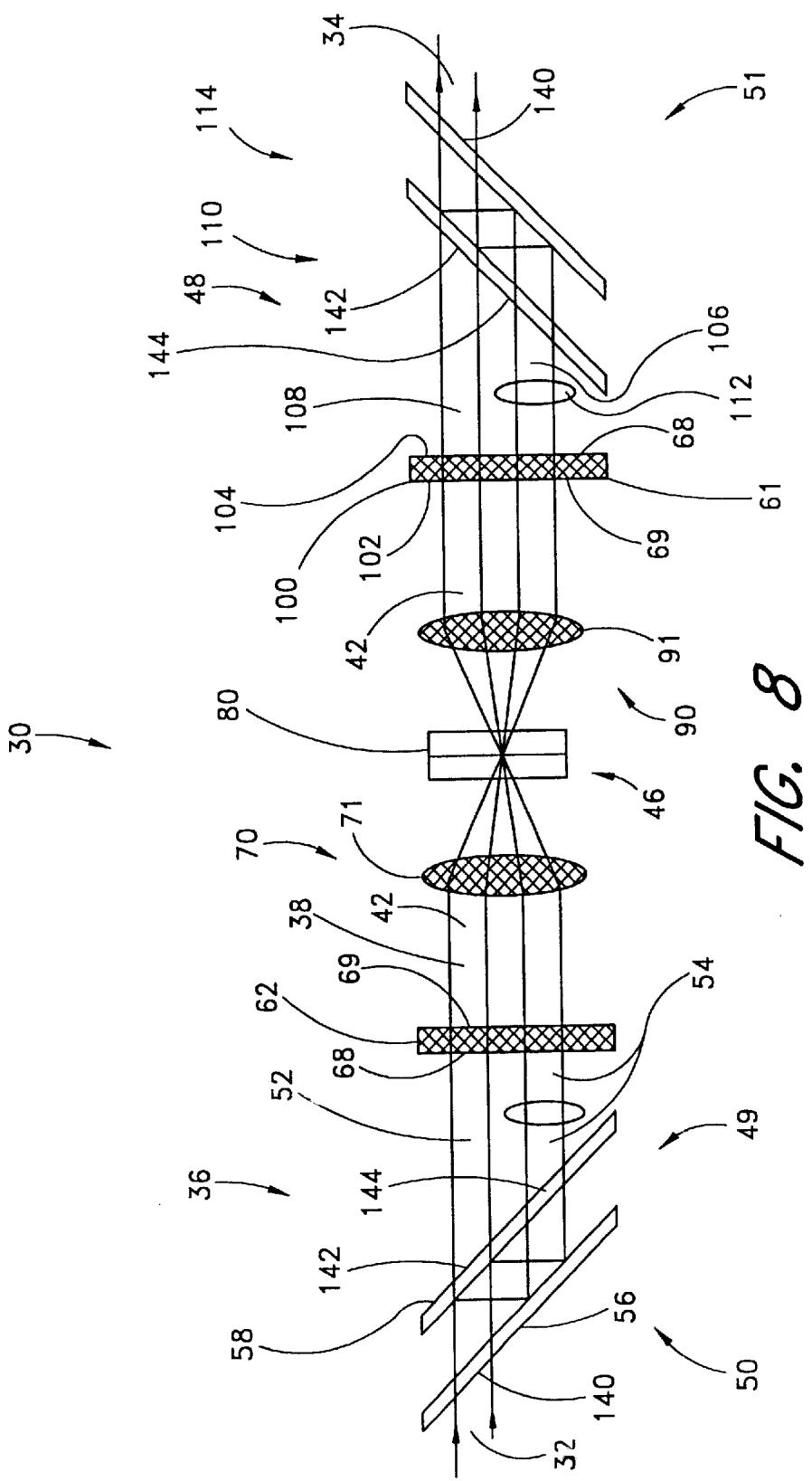
FIG. 8 is a schematic diagram of one embodiment of the light filtering assembly of FIG. 1.

Reference will now be made to FIG. 8 which schematically illustrates the preferred embodiment of the light filtering assembly 30 of FIG. 1 in greater detail. The assembly 30 is symmetrically configured such that the input section 36 is substantially identical to the output section 48. The assembly 30 comprises the first beamsplitter 50 of the input section 36, and a second substantially similar beamsplitter 51 that forms a part of the output section 48. As discussed earlier, the beamsplitter 50 of the polarization converter 49 of the input section 36 receives the input beam 32 at the input face portion 140 of the input face 56 and divides the input beam 32 into the p-polarized and s-polarized beams 52, 54 that respectively exit the output face portions 142, 144 of the output face 58 of the beamsplitter 50 in substantially parallel directions.

Furthermore, in this embodiment, the beam combining element 114 of the depolarizing converter 110 of the output section 48 comprises the beamsplitter 51. The beamsplitter 51 is disposed in a reverse manner so that the p-polarized beam 108 exiting the plate 112 enters the first output face portion 142 of the beamsplitter 51 and so that the s-polarized beam 106 exiting the first beam combining element 100 enters the second output face portion 144 of the beamsplitter 51. Since the beamsplitter 51 is bi-directional and since the beams 106, 108 are substantially parallel and respectively s-polarized and p-polarized, the beamsplitter 51 is able to efficiently combine the beams 106, 108 so as to provide the output beam 34 which exits the input face portion 140 of the beamsplitter 51 in a substantially collimated manner.

In the embodiment of FIG. 8, the assembly 30 further comprises the light dispersing element 62 of the input section 36, and a second substantially identical light dispersing element 61 that forms a part of the output section 48. As mentioned above, the light dispersing element 62 of the input section 36 receives the s-polarized beams 52, 54 at the input face 68 of the element 62. The element 61 then disperses the s-polarized beams 52, 54 so as to provide the spatially separated beamlets 38 that exit the output face 69 of the element 62.

In this embodiment, the first beam combining element 100 of the output section 48 comprises the second light dispersing element 61. The element 61 is symmetrically disposed with respect to the element 62 and oriented so that the input face 102 of the first beam combining element 100 is the output face 69 of the second light dispersing element 61. Likewise, the output face 104 of the first beam combining element 100 is the input face 68 of the element 61. Operating in a reverse manner, the element 61 recombines the desired beamlets 42 entering the output face 69 and recombines the beamlets 42 to form the combined beams 106, 108 which exit the input face 68 of the element 61.

In the embodiment of FIG. 8, the focusing element 70 comprises a telecentric converging lens 71 having a focal length and the collimating element 90 comprises a converging lens 91 that is identical to the lens 71. The lenses 71 and 91 are disposed so as to be respectively displaced from the light dispersing elements 62 and 61 by an amount that is substantially equal to the focal length of the lenses. The lenses 71 and 91 are also respectively displaced from the screen 80 of the filter section 46 by an amount that is substantially equal to the focal length of the lenses 71, 91.

As a result, the desired beamlets 42 entering the lens 71 and the desired beamlets 42 exiting the lens 91 respectively define diverging and converging beam paths 96 and 98 such that the geometry of the diverging beam paths 96 substantially matches the geometry of the converging beam paths 98 as shown in FIG. 3. Since the beamlets 42 exit the collimating element 70 along the converging beampaths 98 that are geometrically similar to the diverging beampaths 96, the beamlets 42 efficiently recombine within the dispersing element 61 so as to provide the recombined beams 106, 108 that exit the element 62b in substantially parallel directions.

Thus it will be appreciated that the light filtering assembly 30 provides improved filtering characteristics. In particular, since the assembly 30 divides the input beam into the plurality of desired beamlets that are spatially separated from the plurality of unwanted beamlets, the assembly 30 is able to substantially attenuate the unwanted wavelength components of the input beam by physically blocking the unwanted beamlets. Furthermore, since the desired beamlets are prepared in a linearly polarized state, they are diffracted by the dispersing elements 62 and 61 with high efficiency. Thus, the assembly 30 passes the desired wavelength components of the input beam with high throughput efficiency and provides improved spectral resolution such that the desired wavelength components can be distinguished from the unwanted wavelength components even if the wavelengths of the wavelength components are different by a relatively small amount.

It will also be appreciated that the light filtering assembly 30 provides substantially stable filtering characteristics in response to a change in temperature. In particular, since the dispersing element 62 has substantially stable dispersing characteristics in response to a change in temperature, the beamlets 38 exiting the element 62 are less likely to be affected by such a temperature change. The thermal stability of the assembly 30 is further enhanced by the use of the beamsplitter 50, the performance of which is substantially unaffected by a changing temperature.

Figure 9:
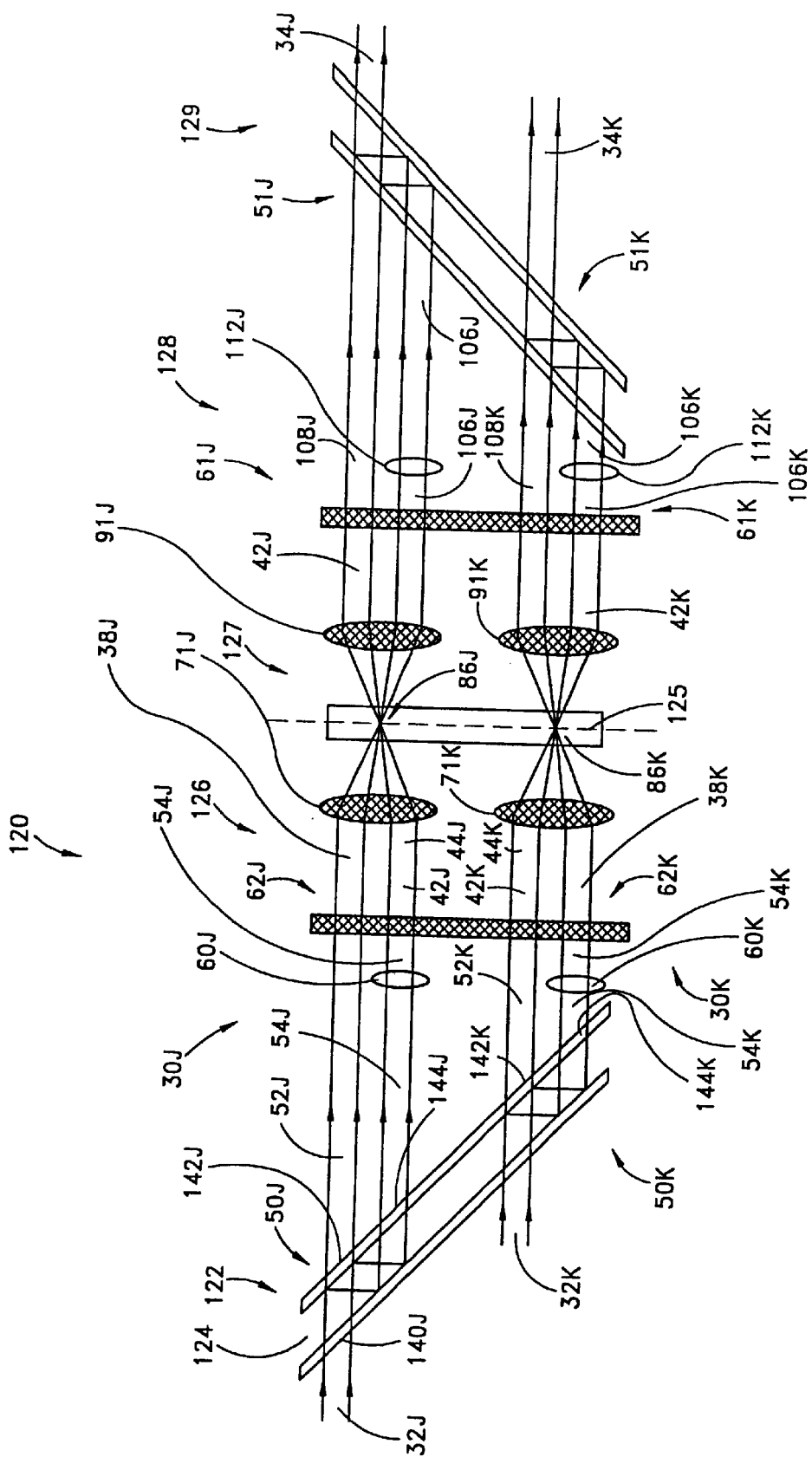
FIG. 9 is a schematic diagram of one embodiment of a light filtering system having improved filtering characteristics that is adapted to receive two separate input light beams and provide two separately filtered output beams in the manner of the light filtering assembly of FIG. 1.

Reference will now be made to FIG. 9 which schematically illustrates one embodiment of a light filtering system 120 in accordance with another aspect with the present invention. The system 120 comprises a first and second light filtering assembly 30j and 30k that are each substantially similar to light filtering assembly 30 of FIG. 8. The assemblies 30j and 30k are preferably disposed in a stacked configuration so as to be adjacent each other. The assemblies 30j and 30k are adapted to respectively receive a first and second input beam 32j and 32k each having desired wavelength components and unwanted wavelength components. The assemblies 30j and 30k filter the beams 32j, 32k in the manner of the light filtering assembly 30 of FIGS. 2 and 3, and provide respective first and second output beams 34j and 34k that comprise the respective desired wavelength components.

As shown in FIG. 9, the system 120 includes a first polarizing beamsplitter sub-system 122 comprising first and second polarizing beamsplitter elements 50j and 50k formed from a common transparent sheet 124 so that the elements 50j and 50k are permanently aligned with each other. Otherwise, the elements 50j and 50k are structurally and functionally identical to the element 50 of FIG. 4.

The first input beam 32j entering a first input face portion 140j of the sub-system 122 is split by the sub-system 122 so that a first p-polarized beam 52j exits a first output face portion 142j of the sub-system 122 and so that a first s-polarized beam 54j exits a second output face portion 144j of the sub-system 122. The beams 52j, 54j travel in substantially parallel directions which are substantially aligned with the direction of the first input beam 32j. The second input beam 32k simultaneously entering a second input face portion 142k of the sub-system 122 is split by the sub-system 122 so that a second p-polarized beam 52k exits a third output face portion 142k of the sub-system 122 and so that a second s-polarized beam 54k exits a fourth output face portion 144k of the system. The output beams 52k, 54k travel in substantially parallel directions which are substantially aligned with the direction of the second input beam 32k.

As shown in FIG. 9, the system 120 comprises the ½ wave plates 60j and 60k. The plates 60j and 60k are disposed so as to respectively receive the s-polarized beams 54j, 54k from the sub-system 122 and provide them with p-polarization.

As shown in FIG. 9, the system 120 comprises the ½ wave plates 60j and 60k. The plates 60j and 60k are disposed so as to respectively receive the p-polarized beams 52j, 52k from the sub-system 122 and provide them with s-polarization.

As shown in FIG. 9, the system further comprises a light dispersing sub-system 126 for receiving the s-polarized beams 54j, 54k exiting the polarizing beamsplitter sub-system 122 and the s-polarized beams 52j, 52k exiting the plates 60j, 60k. As will be described in greater detail below in connection with FIG. 10, the sub-system 126 comprises first and second light dispersing elements 62j and 62k that share a single prism 434, wherein the elements 62j, 62k are each substantially similar to the light dispersing element 62 of FIG. 8. The first element 62j receives the beams 52j, 54j originating from the first input beam 32j and provides a corresponding plurality of spatially separated s-polarized beamlets 38*j*. Likewise, the second element 62*k* receives the beams 52*k*, 54*k* originating from the second input beam 32*k* and provides a corresponding plurality of spatially separated s-polarized beamlets 38*k*.

Figure 10:
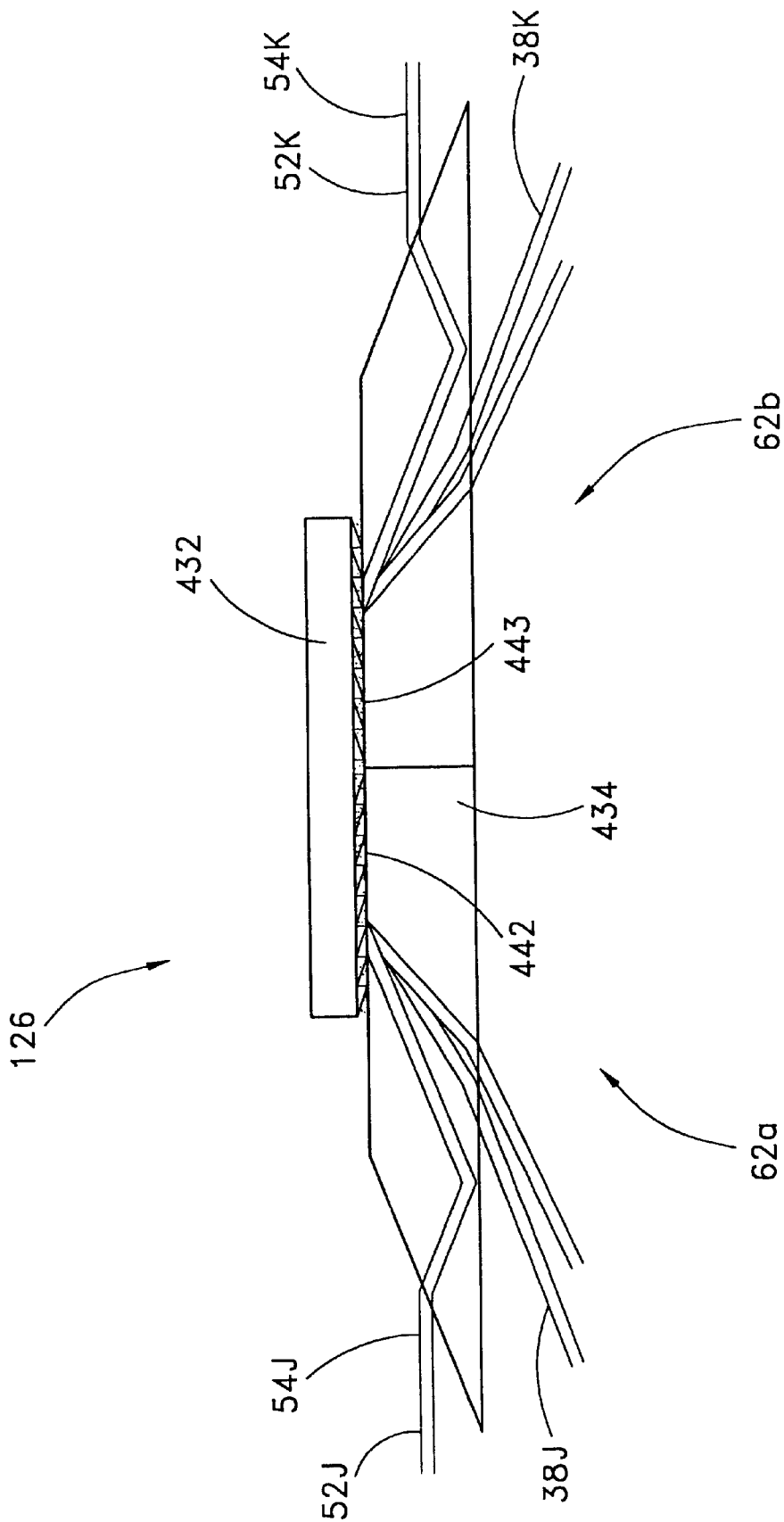
FIG. 10 is a schematic diagram of a light dispersing sub-system of the light filtering system of FIG. 9 that is adapted to separately disperse two input beams with substantial thermal stability and improved throughput efficiency.

FIG. 10 illustrates one embodiment of the light dispersing sub-system 126 of the light filtering system 120 of FIG. 9 in greater detail. The sub-system 126 comprises the first and second light dispersing elements 62*j* and 62*k* that are each substantially similar to the light dispersing element 62 of FIG. 7. In one embodiment, the sub-system 126 comprises the single prism 434 and a single diffraction grating 432 that are adapted so as to provide separate input face portions 68*j*, 68*k*, separate output face portions 69*j*, 69*k* and separate diffracting face portions 442 and 443. The beams 52*j*, 54*j* are received by the input face portion 68*j* and diffracted by the diffracting face portion 442 so as to provide the beamlets 38*j* which exit the output face portion 69*j*. Likewise, the beams 52*k*, 54*k* are received by the input face portions 68*k* and diffracted by the diffracting face portion 443 so as to provide the beamlets 38*k* which exit the output face portion 69*k*.

It will be appreciated that the light dispersing sub-system 126 provides a number of advantages. In particular, the sub-system 126 provides the dispersing elements 62*j*, 62*k* each having improved thermal stability and improved diffraction efficiency. Since the dispersing elements 62*j*, 62*k* share the same prism 234, they can be aligned with each other in a more reliable manner. Moreover, since all of the elements of the sub-system 126 are rigidly attached together, the sub-system 126 is less likely to become misaligned during use. Additionally, since the sub-system 126 includes the singular grating 432, alignment between the dispersing elements 62*j*, 62*k* of the sub-system 126 is further simplified, thus enabling the sub-system 126 to be manufactured at a reduced cost.

Referring back to FIG. 9, each of the light dispersing assemblies 30*j* and 30*k* of the system 120 comprises a respective pair of lenses 71*j*, 91*j* and 71*k*, 91*k* that are both identical to the pair of lenses 71, 91 of FIG. 8. The lens 71*j* receives the beamlets 38*j* having the desired beamlets 42*j* from the light dispersing element 62*j*. Likewise, the lens 71*k* receives the beamlets 38*k* having the desired beamlets 42*k* from the element 62*k*. The lenses 71*j*, 71*k* separately and respectively focus the beamlets 38*j*, 38*k* in a common focal plane. Furthermore, the lenses 91*j* and 91*k* separately and respectively collimate the desired beamlets 42*j* and 42*k* that exit a filter sub-system 127.

As shown in FIG. 9, the system 120 further comprises the filter sub-system 127 for selectively passing the first and second plurality of desired beamlets 42*j*, 42*k* and for selectively blocking a first and second plurality of unwanted beamlets 44*j*, 44*k*. The sub-system comprises an opaque screen 125 having a first and second plurality of apertures 86*j*, 86*k* that are each similar to the plurality of apertures 86 of the screen 80 of FIG. 3. The screen 125 is disposed in the focal plane of the lenses 71*j* and 71*k* so that the apertures 86*j* coincide with the first plurality of desired beamlets 42*j* and so that the apertures 86*k* coincide with the second plurality of desired beamlets 42*k*. Consequently, the unwanted beamlets 44*j*, 44*k* are blocked by the screen 125 and the desired beamlets 42*j*, 42*k* are allowed to exit the screen 125 through the apertures 86*j*, 86*k* so as to be directed toward the lenses 91*j* and 91*k*.

As shown in FIG. 9, the system 120 further comprises a second light dispersing sub-system 128 that receives the beamlets 42*j*, 42*k* exiting the lenses 91*j* and 91*k*. The sub-system 128 is identical to the sub-system 126 and comprises the light dispersing elements 61*j* and 61*k*. The sub-system 128 is arranged in the reverse manner described above in connection with FIG. 8 so that the light dispersing elements 61*j* and 61*k* of the sub-system 128 respectively receive the beamlets 42*j* and 42*k* and combine them in an efficient manner to form the s-polarized combined beam pairs 106*j*, 108*j* and 106*k*, 108*k*. Furthermore, the beams 108*j* and 108*k* are respectively directed through ½ wave plates 112*j* and 112*k* so as to provide the beams 108*j*, 108*k* with p-polarization.

As shown in FIG. 9, the system 120 further comprises a second polarizing beamsplitter sub-system 129 that receives the s-polarized combined beams 106*j*, 106*k* exiting the second light dispersing sub-system 128 and the p-polarized beams 108*j*, 108*k* respectively exiting the plates 112*j*, 112*k*. The sub-system 129 is identical to the sub-system 122 and comprises the first and second polarizing beam splitters 51*j* and 51*k*. The sub-system is arranged in the reverse manner described above in connection with FIG. 8 so that the polarizing beamsplitters 51*j*, 51*k* of the sub-system 129 respectively receive the combined beam pairs 106*j*, 108*j* and 106*k*, 108*k*, and combine them in an efficient manner to form the output beams 34*j*, 34*k*.

Figure 11:
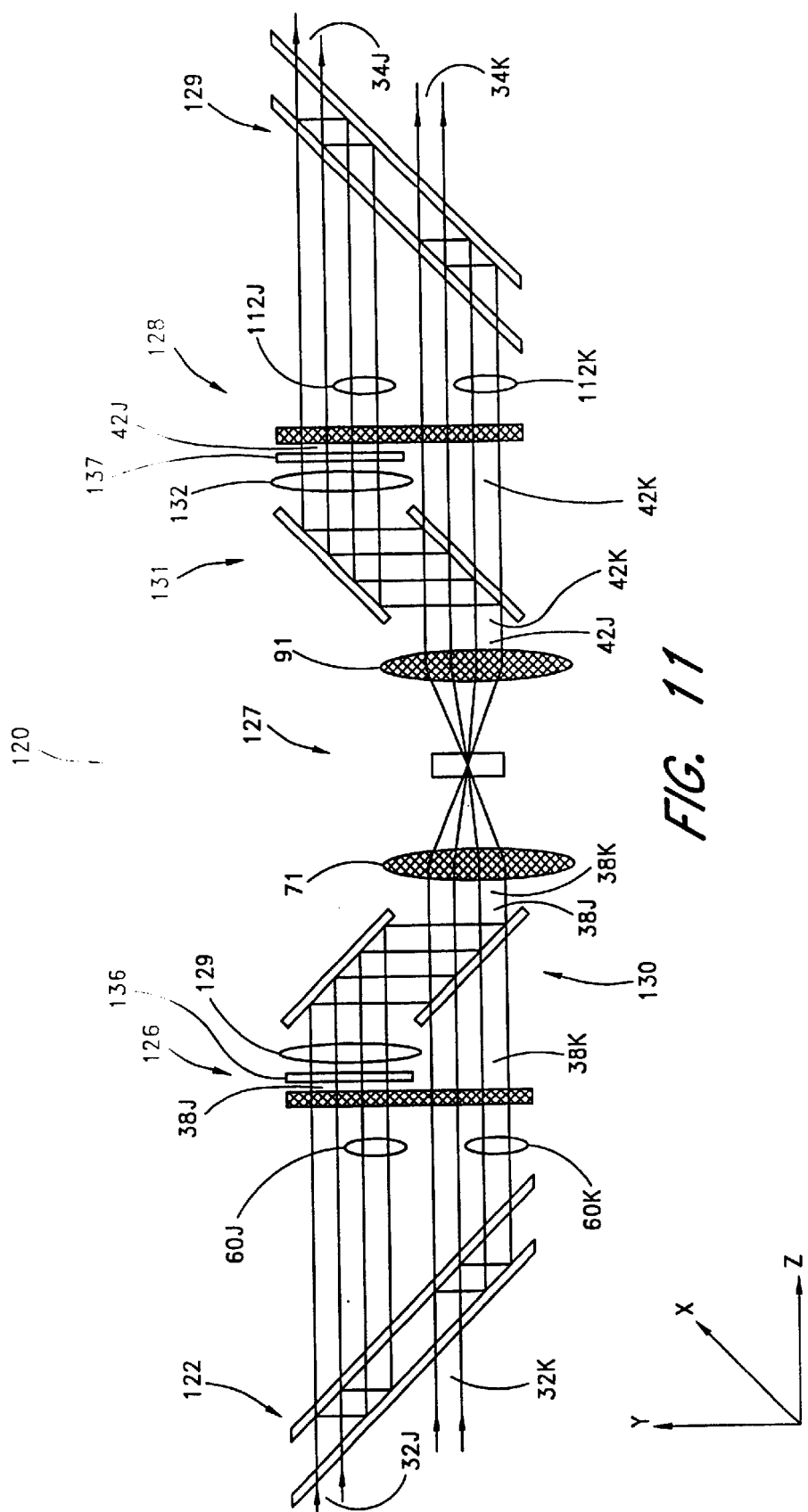
FIG. 11 is a schematic diagram of another embodiment of the light filtering system of FIG. 9 that utilizes fewer components.
Figure 12:
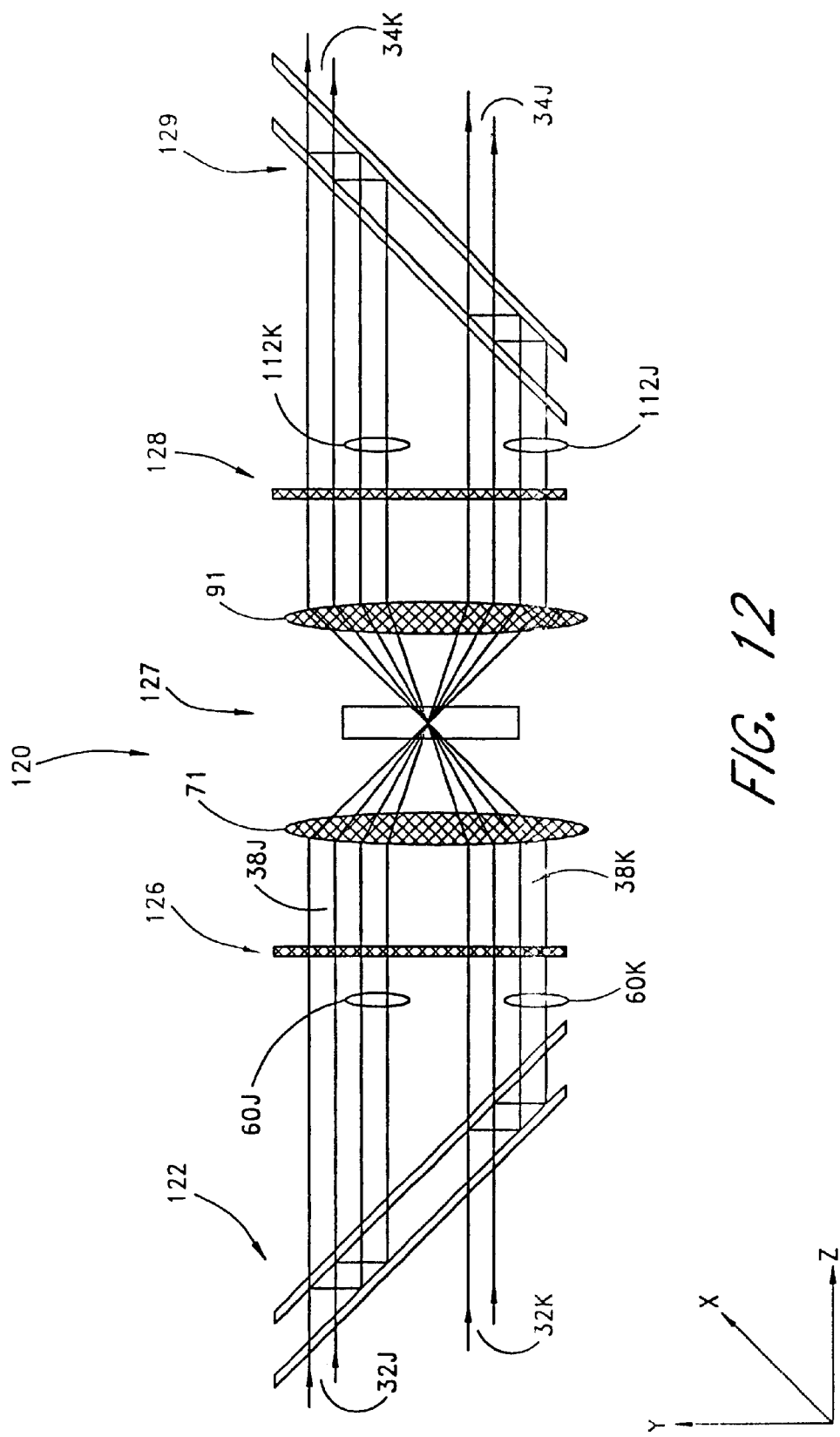
FIG. 12 is a schematic diagram of yet another embodiment of the light filtering system of FIG. 9 that utilizes fewer components.

Reference will now be made to FIGS. 11 and 12 which schematically illustrate other embodiments of the light filtering system 120. In these embodiments the light filtering system 120 comprises the first polarizing beamsplitter sub-system 122 the ½ wave plates 60*j*, 60*k*, and the first light dispersing sub-system 126 for dividing the input beams 32*j*, 32*k* into the respective beamlets 38*j*, 38*k*. The systems 120 of FIGS. 11 and 12 further comprise the filter sub-system 127, the second light dispersing sub-system 128, the ½ wave plates 112*j*, 112*k*, and the second beamsplitter sub-system 129 for respectively selecting the beamlets 42*j*, 42*k* and combining the desired beamlets 42*j*, 42*k* into the output beams 34*j*, 34*k*. However, instead of using separate lens pairs, the systems 120 of FIGS. 11 and 12 uses only the single focusing lens 71 to focus the beamlets 38*j* and 38*k* and the single collimating lens 91 to collimate the beamlets 42*j* and 42*l*, thereby enabling the system 120 to fit into a reduced space.

In the embodiment of FIG. 11, the input beams 32*j*, 32*k* are displaced from each other by a relatively large distance. To compensate for this displacement the system 120 comprises a beamlet merging element 130 that receives the beamlets 38*j* and 38*k* from the light dispersing sub-system 126 and outputs the beamlets 38*j* and 38*k* so that they travel along substantially adjacent beam paths. Furthermore, to provide the output beams 34*j* and 34*k* with relatively large spatial separation, the system 120 further comprises a beamlet expanding element 131 that receives the closely spaced first and second pluralities of desired beamlets 42*j* and 42*k* and outputs the beamlets 42*j* and 42*k* with a relatively large displacement there between.

As shown in FIG. 11, the beamlet merging element 130 comprises a ½ wave plate 132 and a polarizing beamsplitter 133. The plate 132 is disposed so as to receive the s-polarized beamlets 38*k* exiting the light dispersing sub-system 126. The plate 132 outputs the beamlets 38*k* with p-polarization so that the p-polarized beamlets 38*k* are received by the beamsplitter 133. The beamsplitter 133 is disposed so as to receive the p-polarized beamlets 38*k* from the plate 132 and the s-polarized beamlets 38*j* from the sub-system 126. The beamsplitter 133 is identical to the beamsplitter 50 of FIG. 4 and is oriented in the reverse manner so that the s-polarized beamlets 38*j* and the p-polarized 38*k* are received at output face portions of the beamsplitter 133 and output from an input face portion of the beamsplitter 133 along substantially parallel directions.

As shown in FIG. 11, the beamlet expanding element 131 is disposed between the lens 91 and the light dispersing sub-system 128 so as to receive the desired s-polarized beamlets 42j and the p-polarized beamlets 42k traveling along substantially adjacent beam paths. The element 131 is identical to the element 130 and comprises the beamsplitter 134 and the ½ wave plate 135. The beamsplitter receives the beamlets 42j and 42k at an input face and outputs the beamlets 42j and 42k from displaced output face portions so as to displace the s-polarized beamlets 42j from the p-polarized beamlets 42k. The p-polarized beamlets 42k are then directed through the plate 135 so as to provide the beamlets 42k with s-polarization.

As shown in FIG. 11, in one embodiment, the system 120 further comprises a first and second optical compensator 136 and 137. The compensator 136 is disposed between the sub-system 126 and the lens 71 so as to receive the beamlets 38j and the compensator 137 is disposed between the lens 91 and the sub-system 128 so as to receive the beamlets 42j. The compensators 136, 137 compensate for geometrical differences between the paths of the beamlets 38j and the paths of the beamlets 38k.

In the embodiment of FIG. 12, the input beams 32j and 32k are directed along substantially adjacent beam paths. As a result, the beamlets 38j are substantially adjacent the beamlets 38k, thereby allowing the beamlets 38j and 38k to be focused by the single lens 71. Furthermore, the beamlets 42j and 42k exiting the filter 127 are substantially adjacent each other, thereby enabling the single lens 91 to collimate the beamlets 42j and 42k.

In the embodiments of FIGS. 11 and 12, the intensity pattern 76j at the screen 125 associated with the input beam 32j is displaced from the intensity pattern 76k of the input beam 32k by appropriately directing the input beams 32j, 32k. For example, if the beams 32j, 32k are substantially aligned with the z-axis as shown in FIGS. 11 and 12, the pattern 76k can be offset from the pattern 76k along the y-axis by slightly tilting the beam 32j with respect to the beam 32k along the y-z plane. In this case, since the pattern 76j, 76k are elongated along the x-axis, they are imposed on different portions of the screen. Alternatively, if the beam 32j is tilted along the x-z plane, the intensity pattern 76j will be shifted with respect to the pattern 76k along the x-axis.

It will be appreciated that the light filtering systems 120 of FIGS. 9, 11, and 12 provide many advantages. In particular, each of the light filtering systems 120 comprises the first and second light filtering assemblies 30j and 30k that are substantially identical to the improved light filtering assembly 30 of FIG. 8. Thus, the systems 120 are particularly well suited for interleaved filtering applications which require the ability to separately filter two input beams with fine resolution, efficiently transmit desired wavelength components, and effectively block unwanted wavelength components. Furthermore, since many of the components of the assemblies 30j and 30k are shared, the system 120 can be disposed in a reduced space. Moreover, since the beamlets 38j are focused at the first apertures 86j and the beamlets 38k are focused at the second apertures 86k which are separated from the first apertures 86j, the possibility of cross-talk is reduced.

Although the preferred embodiment of the present invention has shown, described and pointed out the fundamental novel features of the invention as applied to this embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appending claims.

What is claimed is:

1. A method of filtering an input beam of light having a plurality of desired wavelength components and a plurality of unwanted wavelength components so as to provide a filtered output beam of light comprising the desired wavelength components, the method comprising:

dividing the input beam into a plurality of polarized beamlets that travel along spatially separated beam paths, said beamlets comprising (a) a plurality of desired beamlets corresponding to the desired wavelength components and (b) a plurality of unwanted beamlets corresponding to the unwanted wavelength components;

separating the desired beamlets from the unwanted beamlets; and combining the desired beamlets so as to provide the filtered output beam, wherein dividing the input beam comprises converting the input beam into at least one linearly polarized beam; and diffracting the input beam, wherein converting the input beam into the at least one linearly polarized beam comprises converting the input beam into a first and second s-polarized beam, and wherein diffracting the input beam comprises directing the at least one linearly polarized beam through a light dispersing element having a diffraction grating so that the at least one linearly polarized beam is diffracted by the diffraction grating.

2. A light manipulating assembly for manipulating an input beam of light having a plurality of wavelength components so as to provide an output beam of light, said assembly comprising:

an input section disposed in the path of the input beam, said input section dividing the input beam into a first plurality of polarized beamlets that travel along a corresponding plurality of spatially separated beamlet paths;

a beamlet manipulator disposed in the beamlet paths so as to manipulate at least one of the first plurality of polarized beamlets in a spatially dependent manner, said beamlet manipulator providing a second plurality of polarized beamlets; and an output section disposed so as to receive the second plurality of polarized beamlets exiting the beamlet manipulator, said output section constructing the output beam from the second plurality of polarized beamlets, wherein the first plurality of polarized beamlets comprises (a) plurality of desired beamlets corresponding to a plurality of desired wavelength components of the input beam and (b) a plurality of unwanted beamlets corresponding to a plurality of unwanted wavelength components of the input beam, wherein the second plurality of polarized beamlets comprises the plurality of desired beamlets, wherein the beamlet manipulator comprises a filter section, said filter section attenuating the unwanted beamlets said filter section passing the desired beamlets, and wherein the filter section comprises an opaque material having a plurality of apertures, said filter section disposed so that the plurality of desired beamlets are aligned with the plurality of apertures, and the plurality of unwanted beamlets are not aligned with the plurality of apertures.

3. A light filtering system for filtering a first and second input beam of light having respective first and second pluralities of desired wavelength components and respective first and second pluralities of unwanted wavelength components, the system comprising:

an input section disposed in the paths of the first and second input beams, said input section dividing the first and second input beams into respective first and second pluralities of polarized beamlets that travel along respective first and second pluralities of spatially separated beam paths, said first and second pluralities of polarized beamlets comprising (a) respective first and second pluralities of desired beamlets corresponding to the desired wavelength components of the first and second input beams and (b) respective first and second pluralities of unwanted beamlets corresponding to the unwanted wavelength components of the first and second input beams;

a filter section disposed in the first and second beam paths, said filter section attenuating the first and second pluralities of unwanted beamlets, said filter section passing the first and second pluralities of desired beamlets; and an output section disposed so as to receive the first and second pluralities of desired beamlets from the filter section, said output section spatially combining the first plurality of desired beamlets so as to provide a first filtered output beam that comprises the desired wavelength components of the first input beam, said output section spatially combining the second plurality of desired beamlets so as to provide a second filtered output beam that comprises the desired wavelength components of the second input beam, wherein the input section comprises an optical compensator disposed in the paths of the first plurality of polarized beamlets and wherein the input section further comprises a diffractive element, said optical compensator modifying the paths of the first plurality of polarized beamlets so as to reduce the differences between the geometry of the first plurality of polarized beamlets and the geometry of the second plurality of polarized beamlets at the diffractive element.

4. A light filtering system for filtering a first and second input beam of light having respective first and second pluralities of desired wavelength components and respective first and second pluralities of unwanted wavelength components, the system comprising:

an input section disposed in the paths of the first and second input beams, said input section dividing the first and second input beams into respective first and second dividing the first and second input beams into respective first and second pluralities of polarized beamlets that travel along respective first and second pluralities of spatially separated beam paths, said first and second pluralities of polarized beamlets comprising (a) respective first and second pluralities of desired beamlets corresponding to the desired wavelength components of the first and second input beams and (b) respective first and second pluralities of unwanted beamlets corresponding to the unwanted wavelength components of the first and second input beams;

a filter section disposed in the first and second beam paths, said filter section attenuating the first and second pluralities of unwanted beamlets, said filter section passing the first and second pluralities of desired beamlets; and an output section disposed so as to receive the first and second pluralities of desired beamlets from the filter section, said output section spatially combining the first plurality of desired beamlets so as to provide a first filtered output beam that comprises the desired wavelength components of the first input beam, said output section spatially combining the second plurality of desired beamlets so as to provide a second filtered output beam that comprises the desired wavelength components of the second input beam, wherein the output section comprises an optical compensator disposed in the paths of the first plurality of desired beamlets and wherein the output section further comprises a diffractive element, said optical compensator modifying the paths of the first plurality of desired beamlets so as to reduce the differences between the geometry of the first plurality of desired beamlets and the geometry of the second plurality of desired beamlets at the diffractive element.

5. A light filtering system for filtering a first and second input beam of light having respective first and second pluralities of desired wavelength components and respective first and second pluralities of unwanted wavelength components, the system comprising:

an input section disposed in the paths of the first and second input beams, said input section dividing the first and second input beams into respective first and second pluralities of polarized beamlets that travel along respective first and second pluralities of spatially separated beam paths, said first and second pluralities of polarized beamlets comprising (a) respective first and second pluralities of desired beamlets corresponding to the desired wavelength components of the first and second input beams and (b) respective first and second pluralities of unwanted beamlets corresponding to the unwanted wavelength components of the first and second input beams;

a filter section disposed in the first and second beam paths, said filter section attenuating the first and second pluralities of unwanted beamlets, said filter section passing the first and second pluralities of desired beamlets; and an output section disposed so as to receive the first and second pluralities of desired beamlets from the filter section, said output section spatially combining the first plurality of desired beamlets so as to provide a first filtered output beam that comprises the desired wavelength components of the first input beam, said output section spatially combining the second plurality of desired beamlets so as to provide a second filtered output beam that comprises the desired wavelength components of the second input beam, wherein the input section comprises a single focusing element that receives the first and second pluralities of polarized beamlets and focuses the first and second pluralities of polarized beamlets in a focal plane.

6. The system of claim 5, wherein the focusing element provides first and second spatially elongated intensity patterns that are each spectrally separated and disposed in the focal plane of the focusing element.

7. The system of claim 6, wherein the first and second spatially elongated intensity patterns are parallel to each other and offset from each other.

8. The system of claim 7, wherein the focusing element comprises a single converging lens.

9. The system of claim 7, wherein the filter section comprises an opaque screen having a first and second plurality of light transmitting apertures formed therein, said opaque screen disposed in the focal plane of the focusing element so that that the first and second pluralities of desired beamlets are respectively aligned with the first and second pluralities of apertures and so that the first and second pluralities of unwanted beamlets are not aligned with the first and second pluralities of apertures.

10. A light filtering assembly for filtering an input beam of light having a plurality of desired wavelength components and a plurality of unwanted wavelength components, the assembly comprising:
  an input section disposed in the path of the input beam, said input section dividing the input beam into a plurality of polarized beamlets that travel along a corresponding plurality of spatially separated beam paths, said plurality of polarized beamlets comprising (a) a plurality of desired beamlets corresponding to the desired wavelength components and (b) a plurality of unwanted beamlets corresponding to the unwanted wavelength components;
  a filter section disposed in the beam paths, said filter section attenuating the unwanted beamlets, said filter section passing the desired beamlets; and
  an output section disposed so as to receive the desired beamlets from the filter section, said output section spatially combining the desired beamlets so as to provide a filtered output beam comprising the desired wavelength components of the input beam, wherein the input section comprises a polarization converter disposed so as to receive the input beam, said polarization converter converting the input beam into at least one s-polarized beam which comprises a first and second s-polarized beam that travel in substantially parallel directions, wherein the input section further comprises a light dispersing element for dispersing the first and second s-polarized beams into the plurality of polarized beamlets, said light dispersing element comprising a diffraction grating, and a focusing element that receives the plurality of polarized beamlets from the light dispersing element, said focusing element focusing the plurality of polarized beamlets in a focal plane.

11. The assembly of claim 10, wherein said focusing by said focusing element provides a spatially elongated intensity pattern that is spectrally separated.

12. The assembly of claim 11, wherein the focusing element directs matching pairs of beamlets having matching wavelengths toward each other so that the matching pairs of beamlets intersect each other in the focal plane of the focusing element.

13. The assembly of claim 12, wherein the focusing element comprises a telecentric converging lens.

14. The assembly of claim 13, wherein the filter section comprises an opaque screen having a plurality of light transmitting apertures formed therein, said opaque screen disposed in the focal plane of the focusing element so that that the desired beamlets transmit through the apertures and so that the unwanted beamlets do not transmit through the apertures.

15. A light filtering assembly for filtering an input beam of light having a plurality of desired wavelength components and a plurality of unwanted wavelength components, the assembly comprising:
  an input section disposed in the path of the input beam, said input section dividing the input beam into a plurality of polarized beamlets that travel along a corresponding plurality of spatially separated beam paths, said plurality of polarized beamlets comprising (a) a plurality of desired beamlets corresponding to the desired wavelength components and (b) a plurality of unwanted beamlets corresponding to the unwanted wavelength components;
  a filter section disposed in the beam paths, said filter section attenuating the unwanted beamlets, said filter section passing the desired beamlets; and
  an output section disposed so as to receive the desired beamlets from the filter section, said output section spatially combining the desired beamlets so as to provide a filtered output beam comprising the desired wavelength components of the input beam, wherein the output section comprises a collimating element disposed so as to receive the desired beamlets from the filter section, said collimating element collimating the desired beamlets.

16. The assembly of claim 15, wherein the collimating element comprises a telecentric converging lens.

17. The assembly of claim 16, wherein the output section further comprises a first beam combining element disposed so as to receive the desired beamlets from the collimating element, said first beam combining element comprising a diffraction grating.

18. The assembly of claim 17, wherein the first beam combining element combines the plurality of desired beamlets into at least one combined s-polarized beam.

19. The assembly of claim 18, wherein the at least one combined s-polarized beam comprises a first and second combined s-polarized beam.

20. The assembly of claim 18, wherein the output section further comprises a depolarization converter disposed so as to receive the at least one combined s-polarized beam from the first beam combining element, said depolarization converter converting the at least one combined s-polarized beam into the unpolarized output beam.

21. The assembly of claim 20, wherein the at least one combined s-polarized beam provided by the first beam combining element comprises a first and second combined s-polarized beam, wherein the depolarization converter combines the first and second s-polarized beams to form the unpolarized output beam.

22. The assembly of claim 21, wherein the depolarization converter comprises a polarizing beamsplitter and a ½ wave plate, said plate disposed in the path of the second combined s-polarized beam so as to convert the second combined s-polarized beam into a combined p-polarized beam, said polarizing beamsplitter comprising an input face and an output face having first and second output face portions, said polarizing beamsplitter disposed so as to respectively receive the first combined s-polarized beam and the combined p-polarized beam at the first and second output face portions of the output face, said polarizing beamsplitter outputting the unpolarized output beam from the input face.

23. A light filtering system for filtering a first and second input beam of light having respective first and second pluralities of desired wavelength components and respective first and second pluralities of unwanted wavelength components, the system comprising:
  an input section disposed in the paths of the first and second input beams, said input section dividing the first and second input beams into respective first and second pluralities of polarized beamlets that travel along respective first and second pluralities of spatially separated beam paths, said first and second pluralities of polarized beamlets comprising (a) respective first and second pluralities of desired beamlets corresponding to the desired wavelength components of the first and second input beams and (b) respective first and second pluralities of unwanted beamlets corresponding to the unwanted wavelength components of the first and second input beams;
  a filter section disposed in the first and second beam paths, said filter section attenuating the first and second pluralities of unwanted beamlets, said filter section passing the first and second pluralities of desired beamlets; and an output section disposed so as to receive the first and second pluralities of desired beamlets from the filter section, said output section spatially combining the first plurality of desired beamlets so as provide a first filtered output beam that comprises the desired wavelength components of the first input beam, said output section spatially combining the second plurality of desired beamlets so as to provide a second filtered output beam that comprises the desired wavelength components of the second input beam, wherein the output section comprises a collimating element disposed so as to receive the first and second pluralities of desired beamlets from the filter section, said collimating element collimating the first and second pluralities of desired beamlets.

24. The system of claim 23, wherein the collimating element comprises a single converging lens.

25. The system of claim 23, wherein the output section further comprises a beam combining element disposed so as to receive the first and second pluralities of desired beamlets from the collimating element, said beam combining element comprising a single substrate element and a single diffraction grating mounted to a surface of the single substrate element.

* * * * *